United States Patent
Duggal et al.

(10) Patent No.: US 12,455,791 B2
(45) Date of Patent: Oct. 28, 2025

(54) STORING NAMESPACE METADATA IN A KEY VALUE STORE TO FACILITATE SPACE EFFICIENT POINT IN TIME SNAPSHOTS

(71) Applicant: Dell Products L.P., Round Rock, TX (US)

(72) Inventors: Abhinav Duggal, Fremont, CA (US); George Mathew, Belmont, CA (US); Philip Shilane, Newtown, PA (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 17/869,507

(22) Filed: Jul. 20, 2022

(65) Prior Publication Data
US 2024/0028466 A1    Jan. 25, 2024

(51) Int. Cl.
  *G06F 16/11*  (2019.01)
  *G06F 11/14*  (2006.01)
  *G06F 16/22*  (2019.01)

(52) U.S. Cl.
  CPC ........ *G06F 11/1453* (2013.01); *G06F 16/128* (2019.01); *G06F 16/2246* (2019.01); *G06F 2201/84* (2013.01)

(58) Field of Classification Search
CPC . G06F 16/128; G06F 16/2246; G06F 11/1453
See application file for complete search history.

(56) References Cited

U.S. PATENT DOCUMENTS

| | | | |
|---|---|---|---|
| 10,891,195 B2 * | 1/2021 | Chen | G06F 3/065 |
| 11,455,255 B1 * | 9/2022 | Jain | G06F 12/10 |
| 11,531,644 B2 * | 12/2022 | Hickey | G06F 16/128 |
| 11,599,506 B1 * | 3/2023 | Shilane | G06F 16/1748 |
| 11,768,807 B2 * | 9/2023 | Shilane | G06F 16/1844 707/664 |
| 2004/0260852 A1 * | 12/2004 | Olstad | G06F 9/526 710/200 |
| 2012/0047111 A1 * | 2/2012 | Hayden | G06F 16/184 707/649 |

(Continued)

FOREIGN PATENT DOCUMENTS

| CN | 101551826 B | * | 10/2011 |
|---|---|---|---|
| CN | 102427458 A | * | 4/2012 |

(Continued)

*Primary Examiner* — Neveen Abel Jalil
*Assistant Examiner* — Hubert Cheung
(74) *Attorney, Agent, or Firm* — Staniford Tomita LLP

(57) ABSTRACT

Metadata of a file system is maintained in a key value store. The metadata includes a namespace represented as a B+ tree having pages written to the key value store. Identifiers to the pages include a snapshot identifier and a page number. The identifiers are stored as keys in the key value store. The snapshot identifiers are used to track pages that are shared between first and second snapshots. Upon a request to write to an existing page, a determination is made from the snapshot identifiers as to whether the existing page belongs to the first or second snapshot. If the existing page belongs to the second snapshot, the write to the existing page is allowed. If the existing page belongs to the first snapshot, a copy on write (COW) is performed to generate a new page for the write.

20 Claims, 14 Drawing Sheets

(56) References Cited

U.S. PATENT DOCUMENTS

| | | | |
|---|---|---|---|
| 2013/0159647 A1* | 6/2013 | Kabano | G06F 16/1727 |
| | | | 711/E12.002 |
| 2017/0153822 A1* | 6/2017 | Xu | G06F 16/13 |
| 2018/0121531 A1* | 5/2018 | Dong | G06F 3/0617 |
| 2019/0121750 A1* | 4/2019 | Keeton | G06F 12/0866 |
| 2020/0042183 A1* | 2/2020 | Meiri | G06F 3/065 |
| 2020/0301784 A1* | 9/2020 | Chen | G06F 3/0604 |
| 2021/0182313 A1* | 6/2021 | Shemer | G06F 11/2097 |
| 2022/0035769 A1* | 2/2022 | Bao | G06F 16/164 |
| 2022/0114139 A1* | 4/2022 | Hickey | G06F 16/182 |
| 2022/0197860 A1* | 6/2022 | Hickey | G06F 3/0643 |
| 2022/0405305 A1* | 12/2022 | Xiang | G06F 16/128 |
| 2023/0027487 A1* | 1/2023 | Hickey | G06F 16/288 |
| 2023/0133361 A1* | 5/2023 | Shilane | G06F 16/1844 |
| | | | 707/664 |
| 2023/0259527 A1* | 8/2023 | Shendge | G06F 16/184 |
| | | | 707/640 |

FOREIGN PATENT DOCUMENTS

| | | | | |
|---|---|---|---|---|
| CN | 104182525 A | * | 12/2014 | ......... G06F 17/3002 |
| CN | 110334073 A | * | 10/2019 | |
| JP | 2007305013 A | * | 11/2007 | |
| WO | WO-2022098744 A1 | * | 5/2022 | .......... G06F 11/1448 |

\* cited by examiner

STORING NAMESPACE METADATA IN A
KEY VALUE STORE TO FACILITATE SPACE
EFFICIENT POINT IN TIME SNAPSHOTS

TECHNICAL FIELD

The present invention relates generally to information processing systems, and more particularly to handling namespace metadata of a deduplicated distributed file system to support snapshots of the namespace.

BACKGROUND

File systems organize data stored in a storage system into a logical format for access by clients including client applications and processes. The file system organizes the data into files and folders into which the files may be stored. When a client requests access to a file, the file system issues a file handle or other identifier for the file to the client. The client can use the file handle or other identifier in subsequent operations involving the file. A namespace of the file system provides a hierarchical organizational structure for identifying files through a file path. A file can be identified by its path through a structure of folders and subfolders in the file system. A file system may hold many hundreds of thousands or even many millions of files across many different folders and subfolders and spanning thousands of terabytes.

Clients can make requests to the file system for file operations such as write, read, rename, copy, and so forth. A deduplicated distributed file system is a type of file system that can reduce the amount of redundant data that is stored and in which data may be spread across multiple storage devices.

In many cases, there is a need to take a point in time snapshot of a namespace, make a writeable copy of that namespace, such as for testing and development purposes, and share unmodified regions of the namespace between snapshots. Being able to share unmodified regions of the namespace can reduce the amount of storage consumed. There are continuing demands to increase efficiency and limit the space that is used.

Such operations and demands, however, are not trivial as such file systems must maintain vast amounts of metadata in order to support deduplication and a distributed namespace. There is a need to support efficient snapshot operations of a file system namespace.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
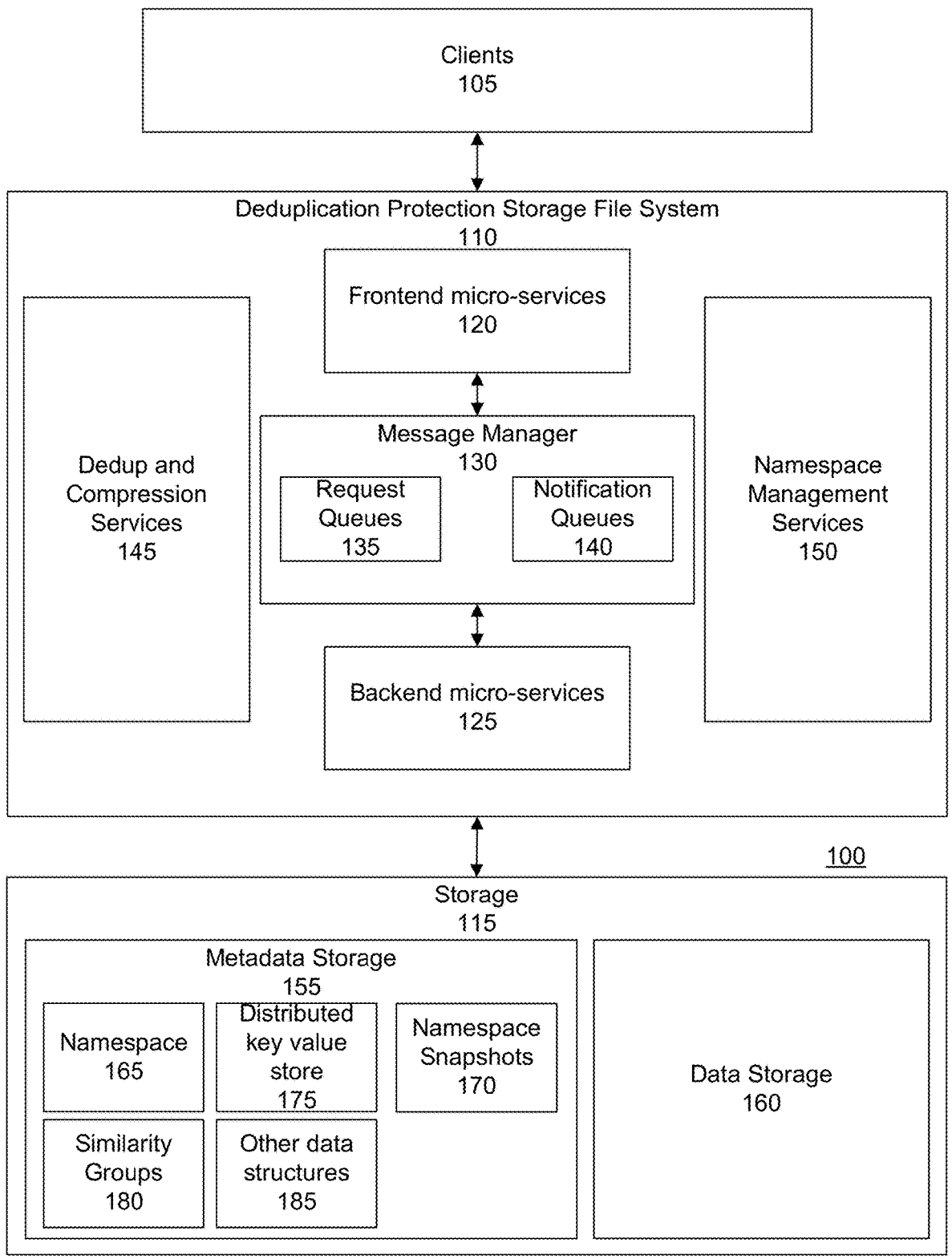
FIG. 1 shows a block diagram of an information processing system for storing namespace metadata in a key value store, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems for storing namespace metadata in a key value store. Such systems and techniques facilitate performing the following operations in an efficient manner: 1) taking a point in time snapshot of a namespace; making a writable copy of the namespace that can be used for test and development purposes; and sharing unmodified regions of the namespace between snapshots.

FIG. 1 shows a block diagram of a computer network or information processing system 100 that provides for an optimized namespace implementation on a key value store that allows space efficient point in time images. This design supports implementing a B+ tree on a key value store where the B+ tree can be cloned, and regions of the B+ tree modified. The modified regions of the B+ tree are duplicated by performing a copy on write (COW) whereas the unmodified regions of the B+ tree are shared between the clones.

This design supports taking point in time images of a namespace as easy as in a log structured file system, without having the overhead of writing immutable metadata objects for every modification.

In an embodiment, the system employs a microservices architecture. A microservice architecture is a design pattern in which complex software systems are composed of relatively small and highly decoupled processes called "microservices." By design, a microservice provides limited functionality narrowly focused on a single task. Each microservice may be independently deployable and upgradeable. Microservices may communicate with each other using language-agnostic application programming interfaces (APIs). Some microservice architectures use inter-process communication mechanisms such as Representational State Transfer (REST) APIs or other language-agnostic APIs. A number of instances of each microservice may scale up or down based on demand. For example, instances of the microservices may be added to accommodate growing demand and maintain file system performance. Alternatively, instances of the microservices may be removed to accommodate decreases in demand and conserve compute resources.

In the example shown in FIG. 1, customer clients 105 access a deduplicated protection storage file system 110 via a network. The file system provides an interface for the clients to store and retrieve their files from an underlying storage system 115.

The file system may be a distributed file system in which data may be spread across multiple storage devices. The file system itself may be hosted by a single node or distributed across multiple nodes of a cluster where files are accessible by a client connecting to any node of the cluster. Data, including metadata, may be shared among the nodes of the cluster such that data can be written to or read from any node of the cluster.

The file system includes frontend microservices 120, backend microservices 125, and a message manager 130 connected between the front and backend microservices. The message manager is responsible for facilitating communications between the frontends and backends. The message manager may include request queues 135 and notification queues 140. A request queue may be referred to as a task queue. Tasks to perform may be pushed to the request queue. Task status update messages may be pushed to the notification queue. The queues provide a buffer to handle different rates of processing among the frontend and backend microservices.

In an embodiment, the file system includes a deduplication and compression service 145 and a namespace management service 150. The deduplication and compression service is responsible for handling deduplication of incoming files and compression of file data that is to be stored. The namespace management service is responsible for handling metadata operations involving a namespace of the file system. Such operations may include, for example, managing a key value store within which metadata of a namespace may be stored, taking a snapshot of the namespace, making a writeable copy of the namespace, tracking pages that are shared between snapshots, initiating a copy on write when changes are to be made to a snapshotted namespace to ensure that a previous or older snapshot of the namespace remains available, and updating the key value store accordingly. Metadata operations involving a namespace also involve customer-visible operations such as creating a file, renaming a file, creating a folder, moving files between folders, deleting a file or folder, etc.

Storage system 115 includes metadata 155 and data or user data 160. User data may include data generated by the client users. Metadata includes data and associated data structures to support the efficient storage, protection, organization, access, retrieval, and modification of the user data. Metadata may include a namespace 165, namespace snapshots 170, distributed key value store 175, similarity groups 180, and other data structures 185 (e.g., mapping tables, Lp tree, fingerprint index, and others). A further discussion of similarity groups and other data structures is provided in U.S. patent application Ser. No. 17/215,586, filed Mar. 29, 2021, and is incorporated by references along with all other references cited.

Figure 2:
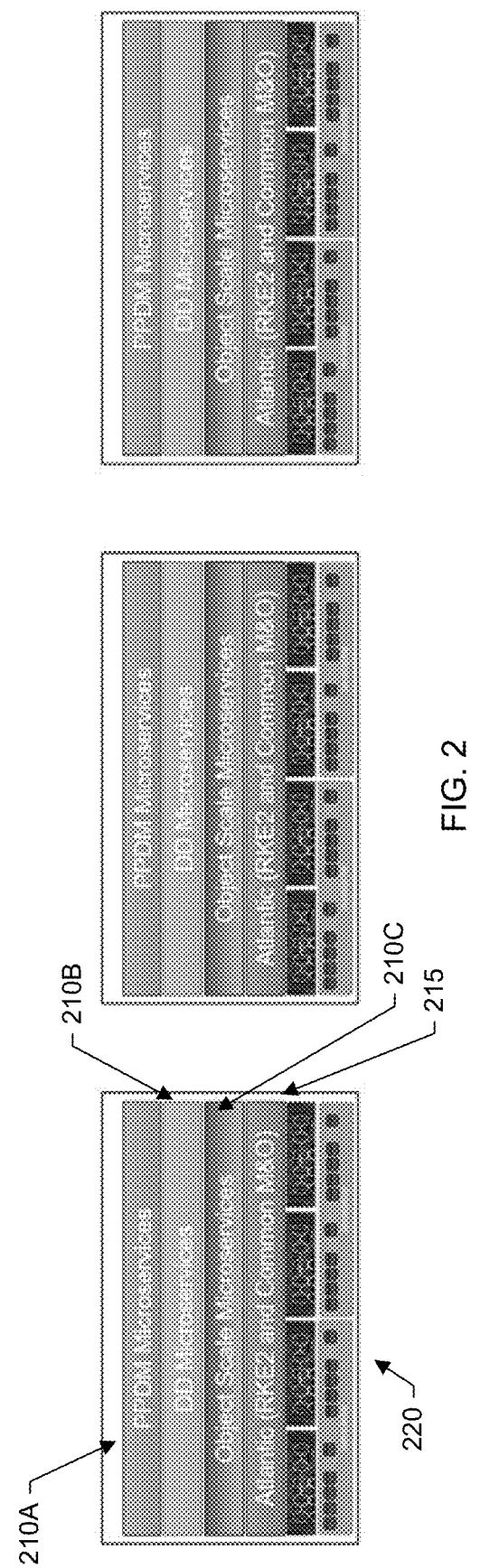
FIG. 2 shows an example of a three-node cluster, according to one or more embodiments.

FIG. 2 shows a high-level architectural overview of a three-node cluster. A cluster may include any number of nodes. Each node in the example of FIG. 2 is shown as including a layered set of microservices including PowerProtect Data Manager (PPDM), Data Domain (DD), and Object Scale microservices 210A-C as provided by Dell Technologies of Round Rock, Texas. These microservices may be deployed as containers and managed by a container orchestration service 215 (e.g., Atlantic Kubernetes). As discussed, an underlying storage system 220 provides for shared storage of data and metadata. Data may include user generated data or content. Metadata may include references, pointers, fingerprints, file properties, and other data to describe and support the manipulation, access, organization, and storage of the user generated data.

PPDM provides software defined data protection, automated discovery, deduplication, operational agility, self-service and IT governance for physical, virtual and cloud environments. Data Domain is a deduplicated storage system. Object Scale provides enterprise object storage for Kubernetes deployments. In other words, in an embodiment, each node includes a hard disk drive (HDD), nonvolatile memory express (NVME) flash storage, solid-state drives (SSDs), Atlantic Kubernetes, Object Scale, DD, and PPDM. Each of these component products includes multiple microservices, and as more nodes are added, the system scales CPU, storage, RAM, and networking accordingly. Some specific embodiments are described in conjunction with storage systems, products, and services referred to as Power Protect DM, Data Domain, and Object Scale as provided by Dell Technologies. It should be appreciated, however, that the described systems and techniques can be applied to other similar data protection storage systems, products, and services.

A container is a virtualized computing environment to run an application program as a service or microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications are run by containers as microservices with the container orchestration service facilitating scaling and failover. For example, the container orchestration service can restart containers that fail, replace containers, kill containers that fail to respond to health checks, and will withhold advertising them to clients until they are ready to serve.

In other words, in an embodiment, file system services run inside the virtualized environment provided by the orchestration service as containers. The container orchestration layer can run on one or multiple physical or virtual nodes, so it can run on premises with dedicated hardware or in a public cloud environment. Data may be stored in a shared storage system. The shared storage system may be a private or public object storage system or other highly available shared storage system that can scale to the needed size and provide data access even if there are underlying hardware failures.

Referring back now to FIG. 1, in an embodiment, the frontend microservices manage namespace operations and build a tree structure for files to support random IO. In an embodiment, the data for a file is divided into large units that may be referred to as L1s (level one in a multi-level tree) spanning megabytes of content, which are directed to back-end microservices where deduplication takes place as well as compression and storage of the data to the underlying shared storage system.

That is, the frontend microservice handles namespace operations, builds the file tree, and assigns data to the backends for deduplication and storage. For namespace operations, the frontends access a B+ tree structure holding the namespace. This tree is a self-balancing tree data structure that maintains sorted data and allows searches, sequential access, insertions, and deletions in logarithmic time. The tree includes the complete folder and file structure of the storage system as well as file inodes. The structures may be partially cached on an instance of the frontend for performance, but the structures are globally accessible in shared storage in case an instance fails and another instance takes over the file handle hash range.

For folder and file updates, the B+ tree structure for the namespace is updated. Updating the B+ tree structure for the namespace includes acquiring a lock on relevant pages of the B+ tree, making the updates, and updating shared storage. The upper parts of the B+ tree may be cached in memory for efficiency. Global locks may be used to avoid concurrent updates to structures.

For file writes, a frontend creates a hierarchical tree structure representing the file, which may be referred to as the Lp tree (Level tree). The L1 pages of the tree refer to L0 segments by a fingerprint (hash and other metadata). The frontend processes incoming data from a client to generate segments (e.g., variable 8 KB in size) that are referred to as the L0s of the tree, and then the upper levels of the tree reference lower levels via pointers.

For reads and random IO, the frontend loads the Lp tree for a file from shared storage. A random read or write is handled by finding the position in the tree that refers to the requested data, and any updates to the Lp tree are handled by the frontends. Overwrites to a L1 are transferred to the backend responsible for that L1 based on its similarity group.

Figure 3:
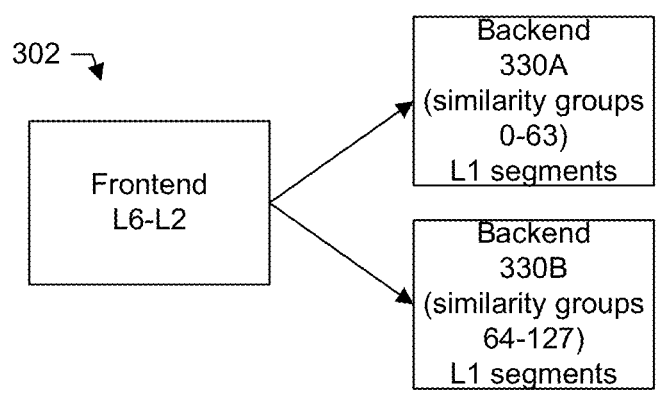
FIG. 3 shows an example of a frontend routing to specific backends based similarity group assignments, according to one or more embodiments.

As shown in the example of FIG. 3, frontends 302 are responsible for the upper part of the Lp tree (e.g., L6-L2 segments) while backends are responsible for L1 segments. The frontend forms a L1 and transfers the L1 content (hundreds to thousands of segments) to a backend for deduplication and storage. A multi-megabyte L1 is formed in a content defined manner. This begins by forming L0 segments in a content-defined manner and then selecting a boundary between L0 segments using a consistent algorithm. The frontend then represents the L1 span of data with a similarity group that is a numeric value in a specified range (e.g., 0-127).

The frontend then uses the similarity group to determine which backend instance is responsible for the L1. In the example shown in FIG. 3, backend 330A is responsible for similarity groups in the range of 0-63, and other backend 330B is responsible for similarity groups in the range of 64-127. The similarity group is consistently hashed to a backend, and the mapping of similarity group assignments is maintained. If a backend fails or there are scale-up or scale-down events, the frontend instances are alerted about changes in the consistent hashing table.

An L1 segment may contain hundreds to thousands of L0 segments. The backend is primarily responsible for deduplication, compression, and storage of the L0 segments. Each similarity group is its own deduplication domain, and since a similarity group is managed by a single backend, the issue of different backends simultaneously updating structures related to similarity groups is avoided.

The backend checks the L0 fingerprints against its memory cache. Only fingerprints associated with the same similarity group are filtered against. This means that the backend has separate fingerprint caches for each similarity group, though many of the caches may be empty at any given time due to memory constraints.

If fingerprints match in the similarity group-based cache, the corresponding L0 segments are filtered out and do not need to be stored again. Otherwise, a fingerprint index for the similarity group is queried. Lookups to the fingerprint index are rate limited such as only allowing one lookup per 1 megabyte (MB) of content. The fingerprint index maps from a <fingerprint, similarity group> to a data structure holding the location where the segments are stored in a compression region as well the location where a list of fingerprints is stored that were previously stored consecutively. In an embodiment, there is a data storage structure referred to as a CMETA container. The CMETA container includes a header and metadata sections of multiple data containers. The CMETA structure is loaded from shared storage to the fingerprint cache for the current similarity group and a check of L0 fingerprints against the cache is performed.

For all L0 segments that are not duplicates, the unique segments are compressed into one or more compression regions. In an embodiment, the compression region size ranges from 64K-128 KB but may vary in other embodiments. Compression regions are packed into a larger structure (container or object) that is written to shared storage, and the fingerprints for L0 segments of the same similarity group in that container are stored as a CMETA structure. The fingerprint index for the similarity group is updated to record the location and size of the L0 segment's compression region as well as the location of the CMETA structure.

Once the compression regions are durably stored (not necessarily to the long term storage), the backend communicates with the frontend that the data is durable, and the frontend can acknowledge updates from the clients.

Since a similarity group is consistently assigned to a backend instance, a read after write will route L1 accesses to the same backend that processed the data, and the L0 segments may still be in the local cache. If not in the local cache, the backend has the unique responsibility to access the L0 segments from shared storage.

Figure 4:
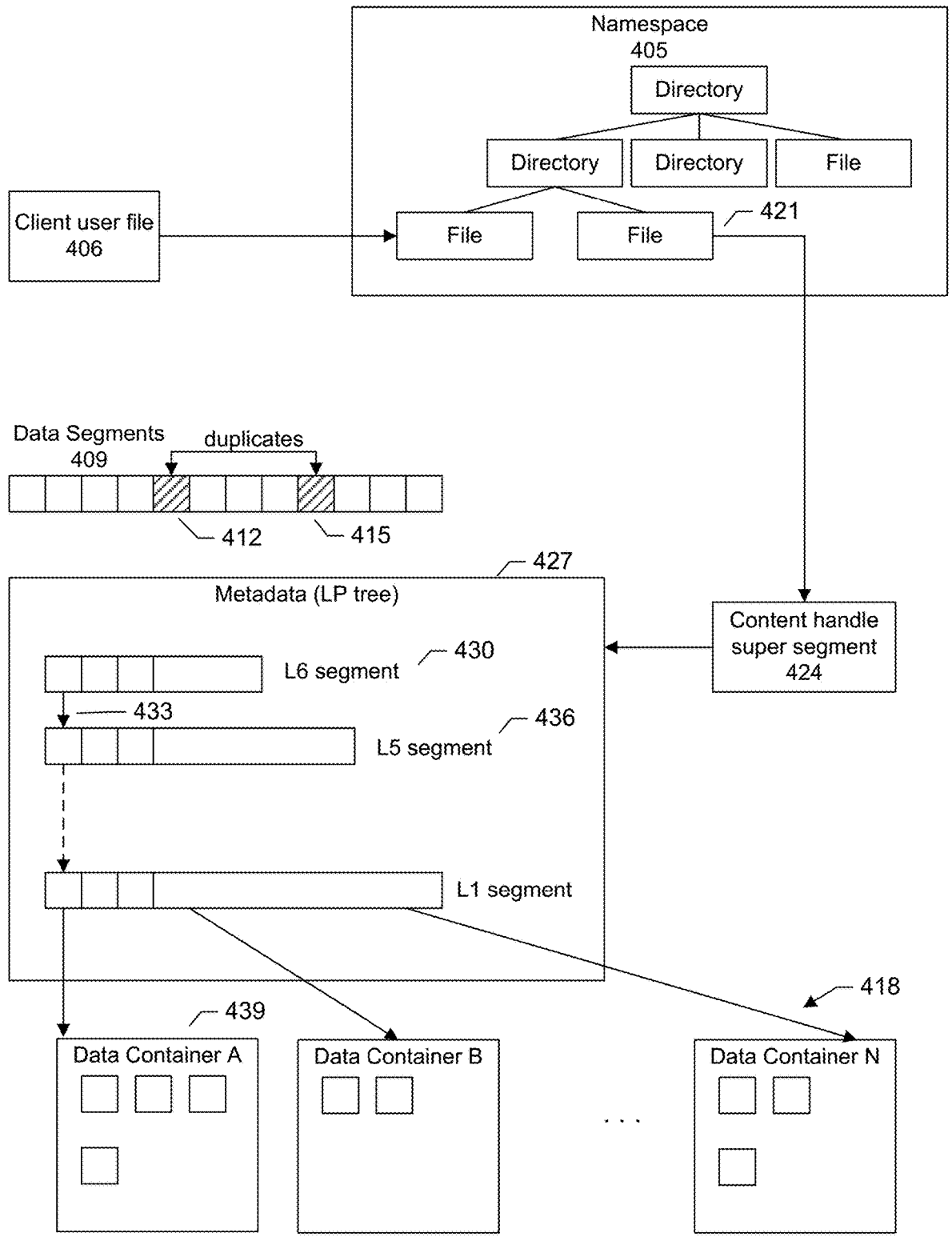
FIG. 4 shows an example of a deduplication process, according to one or more embodiments.

FIG. 4 shows a block diagram illustrating a deduplication process of the file system according to one or more embodiments. As shown in the example of FIG. 4, the file system includes a namespace 405. Further details of a file system namespace are provided in FIG. 5 and the discussion accompanying FIG. 5. As data, such as a user file 406, enters the file system, it is segmented into data segments 409 and filtered against existing segments to remove duplicates (e.g., duplicate segments 412, 415). A segment that happens to be the same as another segment that is already stored in the file system may not be again stored. This helps to eliminate redundant data and conserve storage space. Metadata, however, is stored that allows the file system to reconstruct or reassemble the file using the already or previously stored segment.

Any unique data segments are then stored in fixed size immutable containers 418. A content handle 421 of the file is kept in the file system's namespace to support the directory hierarchy. The content handle points to a super segment 424 which holds a reference to a top of a segment tree 427 of the file. The super segment points to a top reference 430 that points 433 to metadata 436 and data segments 439.

In other words, in a specific embodiment, each file in the file system may be represented by a segment tree. The segment tree includes a set of segment levels arranged into a hierarchy (e.g., parent-child). Each upper level of the segment tree includes one or more pointers or references to a lower level of the segment tree. A last upper level of the segment tree points to the actual data segments. Thus, upper-level segments store metadata while the lowest level segments are the actual data segments. In an embodiment, a segment in an upper level includes a fingerprint (e.g., metadata) of fingerprints of one or more segments in a next lower level (e.g., child level) that the upper-level segment references.

A segment tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes.

In an embodiment, every segment in the file system is identified by a 24 byte key (or the fingerprint of the segment), including the LP segments. Each LP segment contains references to lower-level LP segments.

Figure 5:
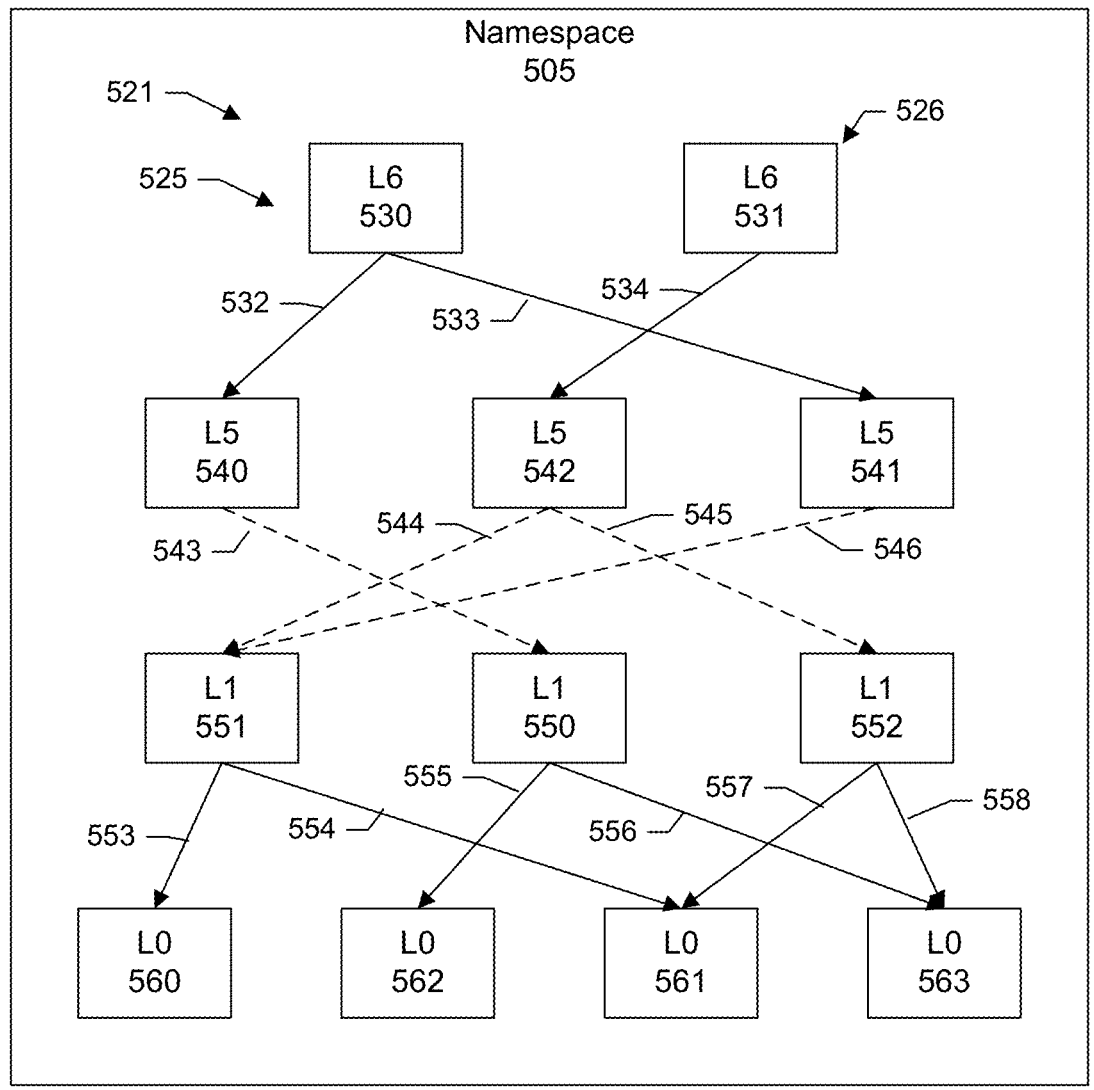
FIG. 5 shows an example of a namespace, according to one or more embodiments.

FIG. 5 shows further detail of a namespace 505 of the file system that may be used to organize the client data stored in the shared storage. Namespaces supporting file system protocols are much more complex than those for object storage service protocols. In particular, the namespace includes a set of segment trees 521 where each file in the file system is represented by a segment tree. A segment tree includes a set of segment levels arranged in a hierarchy. In a specific embodiment, a segment tree can have up to seven levels that may be labeled L6 to L0. For example, one or more intermediate levels may not be present for a relatively small file. A relatively small file may have, in addition to an L0 segment, just an L6 and L1 segment. A relatively large file may have, in addition to an L0 segment, an L6, L5, L4, L3, L2, and L1 segment.

Segments from L6 to L1 are upper-level segments that store metadata (e.g., fingerprints) and may be referred to as LP segments. The lowest level segments are the L0 segments which represent actual data content of the file. An upper-level segment references one or more lower level segments. Thus, an L6 segment includes an array of L5 references. An L5 segment includes an array of L4 references. An L4 segment includes an array of L3 references. An L3 segment includes an array of L2 references. An L2 segment includes an array of L1 references. An L1 segment includes an array of L0 references. In other words, lower level segments are referenced by higher level segments.

The example shown in FIG. 5 shows segment levels L6, L5, L1, and L0. Segment levels L4, L3, and L2 have been omitted for purposes of clarity. An L6 segment forms a root or parent. Thus, in the example shown in FIG. 5, there is a first segment tree 525 having an L6 segment 530 and representing a first file. There is a second segment tree 526 having an L6 segment 531 and representing a second file.

Two or more files may share a same segment. A lower level segment may be referenced by one or more upper level segments. For example, a lower level segment may be referenced by a first upper level segment, and a second upper level segment. The first upper level segment may be from a first segment tree representing a first file. The second upper level segment may be from a second segment tree representing a second file. An upper level segment may reference one or more lower level segments. For example, an upper level segment may reference a first lower level segment and a second lower level segment.

In the example shown in FIG. 5, L6 segment 530 references L5 segments 540, 541 as shown by arrows 532, 533 from L6 530 to L5 540, 541, respectively. L6 segment 531 references L5 segment 542 as shown by an arrow 534 from L6 531 to L5 542. L5 segment 540 references an L1 segment 550 as shown by an arrow 543 from L5 540 to L1 550. L5 segment 542 references L1 segments 551, 552 as shown by arrows 544, 545 from L5 542 to L1 551, 552, respectively. L5 segment 541 references L1 segment 551 as shown by an arrow 546 from L5 541 to L1 551. The arrows from the L5 to L1 segment level are shown in broken lines to indicate that there can be other intermediate levels between the L5 and L1 levels.

L1 segment 551 references L0 segments 560, 561 as shown by arrows 553, 554 from L1 551 to L0 560, 561, respectively. L1 segment 550 references L0 segments 562, 563 as shown by arrows 555, 556 from L1 550 to L0 562, 563, respectively. L1 segment 552 references L0 segments 561, 563 as shown by arrow 557, 558 from L1 552 to L0 561, 563, respectively.

In a specific embodiment, an upper level segment includes a fingerprint of fingerprints of one or more lower level segments referenced by the upper level segment. For example, L6 segment 530 includes a finger of fingerprints of L5 segments 540, 541. L6 segment 532 includes a fingerprint of fingerprint of L5 segment 542. L5 segment 540 includes a fingerprint of fingerprint of L1 segment 550. L5 segment 542 includes a fingerprint of fingerprints of L1 segments 551, 552, and so forth.

Figure 6:
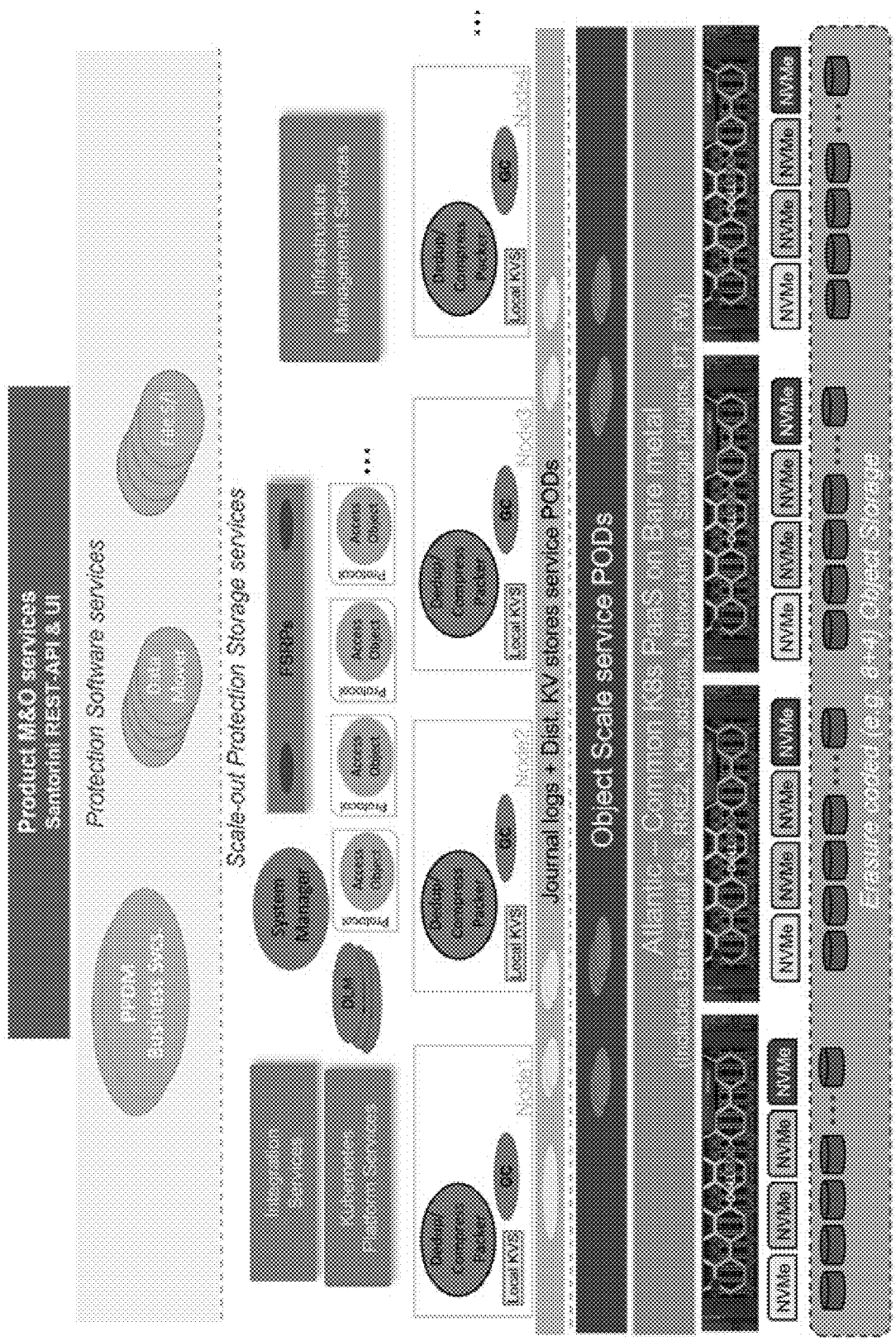
FIG. 6 shows an integrated system architecture having a system for storing namespace metadata in a key value store, according to one or more embodiments.

FIG. 6 shows further detail of architectural layers of the file system including details of the services related to the data path, according to a specific embodiment. As discussed, in an embodiment, there is a data protection product referred to as PowerProtect Data Manager (PPDM). PPDM provides backup software functionality. The FSRP service redirects file operations in a consistent manner based on a hash of the file handle, path, or other properties to instance of the Access Object service. The Access Object service handles protocols, FM/DM and the Content Store module. That is, files are segmented and the Lp tree is constructed by Access Object.

As an L1 is formed, a similarity group is calculated for the L1 based on the SHA1 fingerprints of the L0 segments (or other properties). The similarity group is checked against a mapping table, which leads to consistently routing the L1 based on its similarity group to an instance of the Dedup-Compress service. For example, if similarity groups are in a range of 0-1023, then if there are four instances of the DedupCompress service, then the instances may uniquely be responsible for the ranges 0-255, 256-511, 512-767, 768-1023, respectively, though other mappings are possible. The DedupCompress instance deduplicates the L0 segments relative to other fingerprints within the same similarity group. Other functionality exists in the DedupCompress service such as packing segments into compression regions, containers, and blobs that are written to an underlying object storage such as ObjectScale or an object store provided by the public cloud.

In an embodiment, distributed key value stores are used to hold much of the metadata such as the namespace Btree, the Lp tree, fingerprint index, and container fingerprints. These run as containers within the cluster and are stored to low latency media such as NVMe. The distributed key value store runs on multiple nodes of the cluster. Distributing the store across multiple nodes allows for increased processing performance and large datasets because demands for memory and processing are distributed across multiple nodes.

In an embodiment, the file system can be divided into multiple logical partitions that may be referred to as mtrees. These logical partitions or mtrees allow for granular management of snapshots, storage quotas, and retention locks. The namespace of the file system is visible to the user an mtree. The namespace of the mtree is represented as a B+ tree and, in this embodiment, the B+ tree is stored as a deduplicated file in the file system. Each modification for the B+ tree writes the modified region as an immutable container, and the B+ tree file metadata is updated to point to the newly updated regions for every write. In this design, taking a point in time image of a namespace preserves the metadata for the corresponding namespace B+ tree file.

The file system supports multiple mtrees. Each mtree is a mountable directory hierarchy and is identified by an identifier referred to as an mtree-id (mid). For each mtree, a snapshot identifier (sid) is incremented whenever a point in time copy (snapshot) of the namespace is taken. For every point in time image taken for the namespace, the corresponding B+ tree file metadata is preserved as a file and is identified by its <mid:sid>. The B+ tree file for the active namespace is identified by <mid:0>. Since the namespace metadata was written as immutable containers, any modification on a namespace results in new container written for that modification and the current namespace B+ tree file will point to the new data. The data for the snapshot's namespace B+ tree file still will point to the previous containers and will be unchanged.

As discussed, the namespace data for the mtree is stored as a B+ tree. In another embodiment, however, instead of storing the namespace B+ tree as a deduplicated file, each node (or page) of the B+ tree is kept in the key value store with a key identifying the node (page) of the B+ tree and the content of the page stored as value for the key. In this design, the namespace data is no longer immutable. A change in the namespace entry will modify the corresponding value of a page in the key value store. Since the key value store is not immutable, if a snapshot and the current active namespace shares the same B+ tree pages, the change made in the current namespace will be visible in the snapshot too. One way to preserve the snapshot B+ tree page is to keep track of shared pages between the snapshots and active namespace and make sure that a copy on write for the pages is performed whenever it is modified. The following scheme describes a way in which a point in time image for a namespace can be taken efficiently while sharing unmodified pages between an active B+ tree and a snapshot B+ tree.

Figure 7:
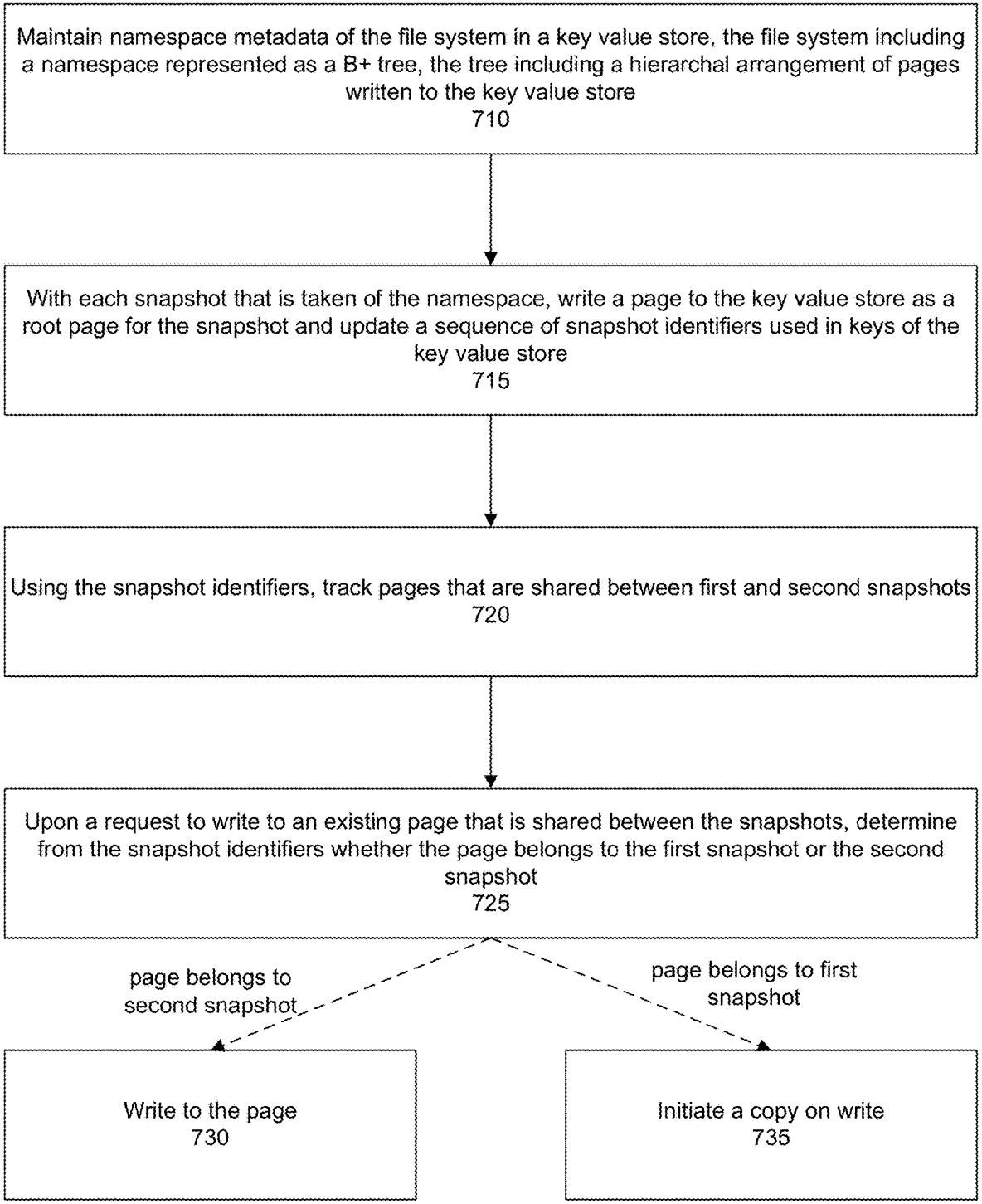
FIG. 7 shows an overall flow for handling snapshots of a namespace of a file system, according to one or more embodiments.

FIG. 7 shows an overall flow for handling snapshots of a namespace of a file system. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 710, namespace metadata of the file system is maintained in a key value store. The file system includes a namespace represented as a B+ tree. The B+ tree includes a hierarchal arrangement of pages that are written to the key value store. The pages include a root page, intermediate pages pointing to lower level pages, and leaf pages at the lowest level. In a B+ tree, records (data) are stored on the leaf pages while intermediate pages including the root page store the key values. That is, intermediate pages point to another page of the tree while leaf pages store the data pointers (e.g., pointers to the actual record in the disk or to a disk file block containing that record).

Identifiers are defined to the pages as a tuple that includes an mtree identifier (e.g., "mid"), a snapshot identifier (e.g., "sid"), and a page number. The identifiers to the pages are stored as keys in the key value store.

In a step 715, with each snapshot that is taken of the namespace, a page is written to the key value store as a root page for the snapshot and a sequence of snapshot identifiers used in keys of the key value store are updated.

In a step 720, the snapshot identifiers are used to track pages that are shared between different (e.g., first and second) snapshots.

In a step 725, upon a request to write to an existing page that is shared between the snapshots, a determination is made from the snapshot identifiers as to whether the page belongs to the first snapshot or the second snapshot.

If the page belongs to the second snapshot, the write is allowed to proceed to the page (step 730). If, however, the write does not belong to the second snapshot, a copy on write (COW) is initiated so that the existing page remains accessible via the root page of the old, previous, or first snapshot while a new page of the write is accessible via the root page of the second snapshot. In an embodiment, the second snapshot is a read/writable snapshot showing a current state of the file system or the latest consistent set of data In other words, the COW includes writing the new page to the key value store and assigning a new snapshot identifier to the new page. In an embodiment, the new snapshot identifier is generated by incrementing a value of a snapshot identifier assigned to a last snapshot. The key to the new page is thus formed using the new snapshot identifier. Further discussion is provided below.

Figure 8:
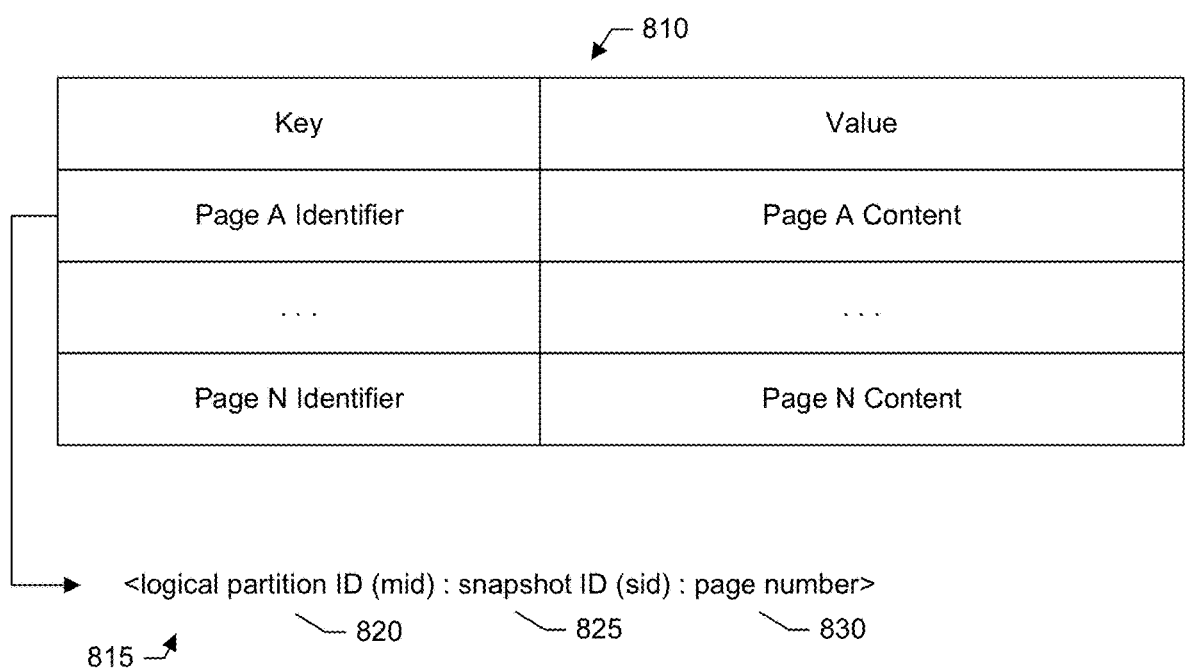
FIG. 8 shows an example of a key value store, according to one or more embodiments.

FIG. 8 shows an example of a key value store or database 810 storing a namespace of the file system. A key-value store is a type of data structure that stores data as a set of unique identifiers, each of which have an associated value. This data pairing may be referred to as a "key-value pair." The unique identifier is the "key" for an item of data, and a value is either the data being identified or the location of that data. Key-value stores, as compared to traditional relational databases, can offer very fast performance for reads and writes, in part because the database is searching for a single key and is returning its associated value rather than performing complex aggregations as may be the case with relational databases.

As discussed, in an embodiment, the namespace is represented as a B+ tree where pages of the tree are written to the key value store. Page identifiers form the keys of the key value store and page content form the values of the key value store. In an embodiment, the keys are defined using a tuple 815. In an embodiment, the tuple includes an identifier of a logical partition (e.g., mtree identifier) 820, an identifier of a snapshot taken of the namespace 825, and a page number 830 of a page in the B+ tree.

In an embodiment, each active B+ tree keeps track of a "next_snapshot_id." Every time a snapshot is taken, the snapshot is assigned the next snapshot id and the next_snapshot_id is incremented after that. The B+ tree for the snapshot is identified by the <mid:sid>.

For example, if the "next_snapshot_id" of mtree with mid==99 is 10, taking a snapshot will create a point in time image of the namespace identified by <99:10> and the "next_snapshot_id" will get bumped up to 11. Unlike a single node system, the active btree is identified by <mid:next_snapshot_id>. In this example, the active mtree would be identified by <99:11>. In a single node system, snapshot 0 is used to identify the active mtree. Any reference to the active mtree (sid=0) is translated to "sid=next_snapshot_id" and the corresponding btree structure will be identified.

In an embodiment, the btree pages are stored in the key value store with the key <DMBT:mid:sid:page_number>, where "DMBT" is a fixed string, "mid" is the mtree identifier for the namespace, "sid" is the snapshot identifier for the namespace and "page_number" identifies a page in the btree. The root of the btree is page 0 and the root page for an mtree will be stored in the key value store with the key name <DMBT:mid:sid:0>. For an active mtree, the "next_snapshot_id" will be used as the "sid" to access the root of the b+ tree whereas for a snapshot, the snapshot identifier will be used as the "sid" to access the root page.

For an active btree, every time a page is written it is written using the next snapshot id as the "sid" for the page. Every time a snapshot is created the following operations are performed as shown in the flow of table A below.

TABLE A

| Step | Description |
| --- | --- |
| 1 | Flush all dirty pages - including the root page. |
| 2 | Increment the next_snashot_id for the mtree. |
| 3 | Mark the root page of the btree dirty and flush it again. |

In the previous example where the mtree had "next_snapshot_id" as 10 and a new snapshot is taken, the following events occur as shown in the flow of table B below.

TABLE B

| Step | Description |
| --- | --- |
| 1 | All btree dirty pages will be written with <DMBT:99:10:page_number> as the key. The root page for this btree will be <DMBT:99:10:0>. |
| 2 | The next_snapshot_id for the mtree will be bumped up to 11. |
| 3 | The root page is dirtied and flushed with the key <DMBT:99:11:0>. |
| 4 | The file system metadata will be updated to capture the snapshot information as <99:10> and the active as <99:11>.<br>At this point, the key value store includes two pages in the key value store. There is a page for the root page of the snapshot 10 that is accessible as <DMBT:99:10:0> and there is a page for the root page of the active that is accessible as <DMBT:99:11:0>. Since the content of both the root pages are the same, they will have the same data and will point to the same set of pages. |

In an embodiment, a Btree supports two kind of pages—leaf pages that store btree records, and intermediate pages that point to pages that are a level below. The root page itself is an intermediate page. The intermediate page entries have the form <dd_key_t:dd_btree_indirect_t>. The "dd_key_t" shows the btree-key that is looked up and "dd_btree_indirect_t" is a record of the form <mid:sid:page_number> that points to the child page of the B+ tree where the lookup should be continued.

This "dd_btree_indirect_t" structure allows the key to point to a page of a different <mid:sid>. In the previous example, the root page of the active btree identified by <99,11> can have a pointer to an indirect page 2 from the snapshot with "sid 10" for a key B+ tree key 77. In this case the "dd_indirect_btree_t" of the root page for <99:11> will have an entry <77:<99:10:2>>.

If the "dd_btree_indirect_t" structure has a different <mid:sid> compared to the btree, any modification for the page, should do a copy on write for the page and modify the corresponding "dd_btree_indirect_structure_t."

In the previous example, when the indirect page 2 is read, the root page entry for the indirect page <77:<99:10:2>> is followed and it will be read from the key value store with key=<DMBT:99:10:2>. If the page is modified and written, it will be written as key=<DMBT:99:11:2>, to match the active mtree's "sid (11)", and the root page entry will be modified so that the new entry is <77:<99:11:2>>.

This ensures that the page for snapshot 10 is not modified. If the same page is modified again, since the root page entry points to key <77:<99:11:2>>, that matches to the btrees <mid:sid>, it is not necessary to perform another copy on write, so the page can be modified without adjusting the root's entry.

The maintaining of a sequence of snapshot identifiers allows for determining whether a page is being shared by an older snapshot or whether the page is owned by the active btree. In particular, if a snapshot identifier of the page is different from a snapshot identifier of the active btree, a determination is that the page is not owned by the active btree. Thus, a copy on write is initiated by writing a new page to the key value store where the new page is assigned the snapshot identifier of the active btree. If the snapshot identifier of the page is the same as the snapshot identifier of the active btree, the copy on write does not have to be performed and the write can proceed using the page because the page is owned by the active btree.

Leaf pages are the lowest level pages and store keys and their values. The leaf pages have the form [<dd_key_t1: off1>, <dd_key_t2:off2>, <dd_key_t3:off3> . . . <blob1>, <blob2>, <blob3>], where "dd_key_t" is the btree-key that is looked at and the offset points to a blob in the page that has the value for the "dd_key."

For a file name, the 'blob' that stores the data for the filename will point to an inode number and the corresponding inode is stored in the key value store with the key <INODE:mid:sid:inum>. Similar to the btree pages, a file name entry in a btree can point to an inode with a different <mid:sid>. If the inode is modified, it will be written with the btree's mid sid and the file name entry in the btree leaf page will be modified to point to the new key.

In the previous example, if the file "foo-bar" had the entry <INODE:99:10:20> in the active btree, the inode will be read from the key value store using the key <INODE:99:10:20>. If the inode is modified and written, the node will be written to the key <INODE:99:11:20> and the btree leaf page will be modified so that the file name entry points to <INODE:99:11:20>.

This design also allows for creating a point in time copy of a namespace identified by "mid1" and exposes it as a writable new namespace. In this process, a snapshot of mid1 (e.g., "sid1") and a copy of the root page for <mid1:sid1> can be taken and exposed as <mid2:0>. Then clients can access and modify "mid2" without impacting mtree "mid1."

Figure 9:
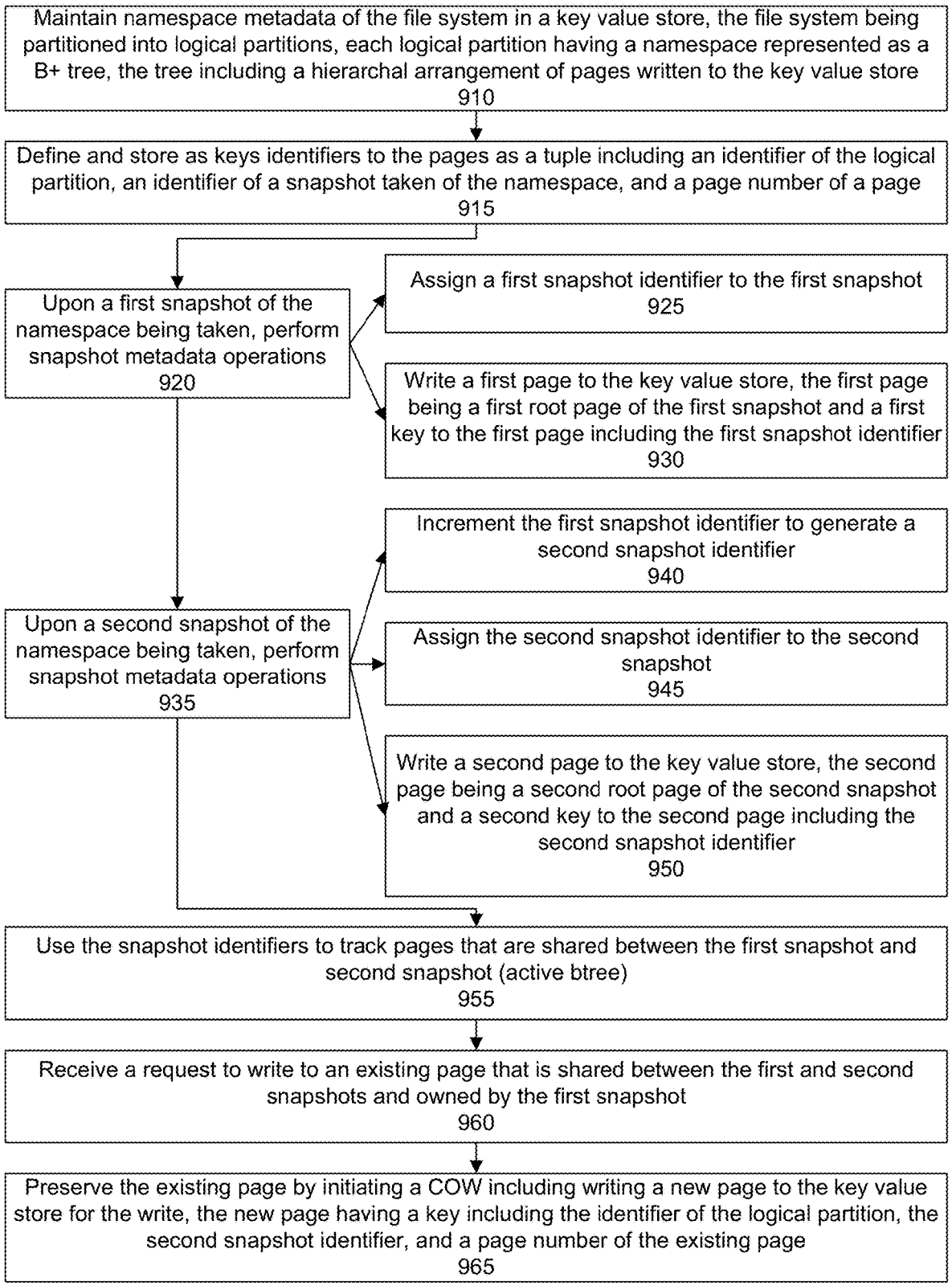
FIG. 9 shows another flow for handling snapshots of a namespace, according to one or more embodiments.

FIG. 9 shows another more detailed flow for handling snapshots of a namespace of a file system. In a step 910, namespace metadata of a file system is maintained in a key value store. In an embodiment, the file system is partitioned into a set of logical partitions. Each partition has a namespace represented as a B+ tree, the tree including a hierarchal arrangement of pages written to the key value store.

In a step 915, identifiers to the pages are defined as a tuple including an identifier of the logical partition (e.g., "mid"), an identifier of a snapshot taken of the namespace (e.g., "sid"), and a page number of a page. As discussed, the identifiers to the pages are stored as keys in the key value store.

In a step 920, upon a first snapshot of the namespace being taken, snapshot metadata operations are performed. In an embodiment, the snapshot metadata operations include assigning a first snapshot identifier to the first snapshot (step 925) and writing a first page to the key value store (step 930). The first page is a first root page of the first snapshot and a first key to the first page includes the first snapshot identifier.

In a step 935, upon a second snapshot of the namespace being taken, another set of snapshot metadata operations are performed. In an embodiment, the snapshot metadata operations include incrementing the first snapshot identifier to generate a second snapshot identifier (step 940), assigning the second snapshot identifier to the second snapshot (step 945), and writing a second page to the key value store (step 950). The second page is a second root page of the second snapshot and a second key to the second page includes the second snapshot identifier. The second snapshot may now be referred to as a current or active btree.

In a step 955, the snapshot identifiers are used to track pages that are shared between the first snapshot and active btree.

In a step 960, a request is received to write to an existing page that is shared between the first snapshot and active btree and owned by the first snapshot.

In a step 965, the existing page is preserved by initiating a copy on write. The copy on write includes writing a new page to the key value store for the write. The new page is given a key that includes an identifier of the logical partition, the second snapshot identifier, and a page number of the existing page.

Figure 10:
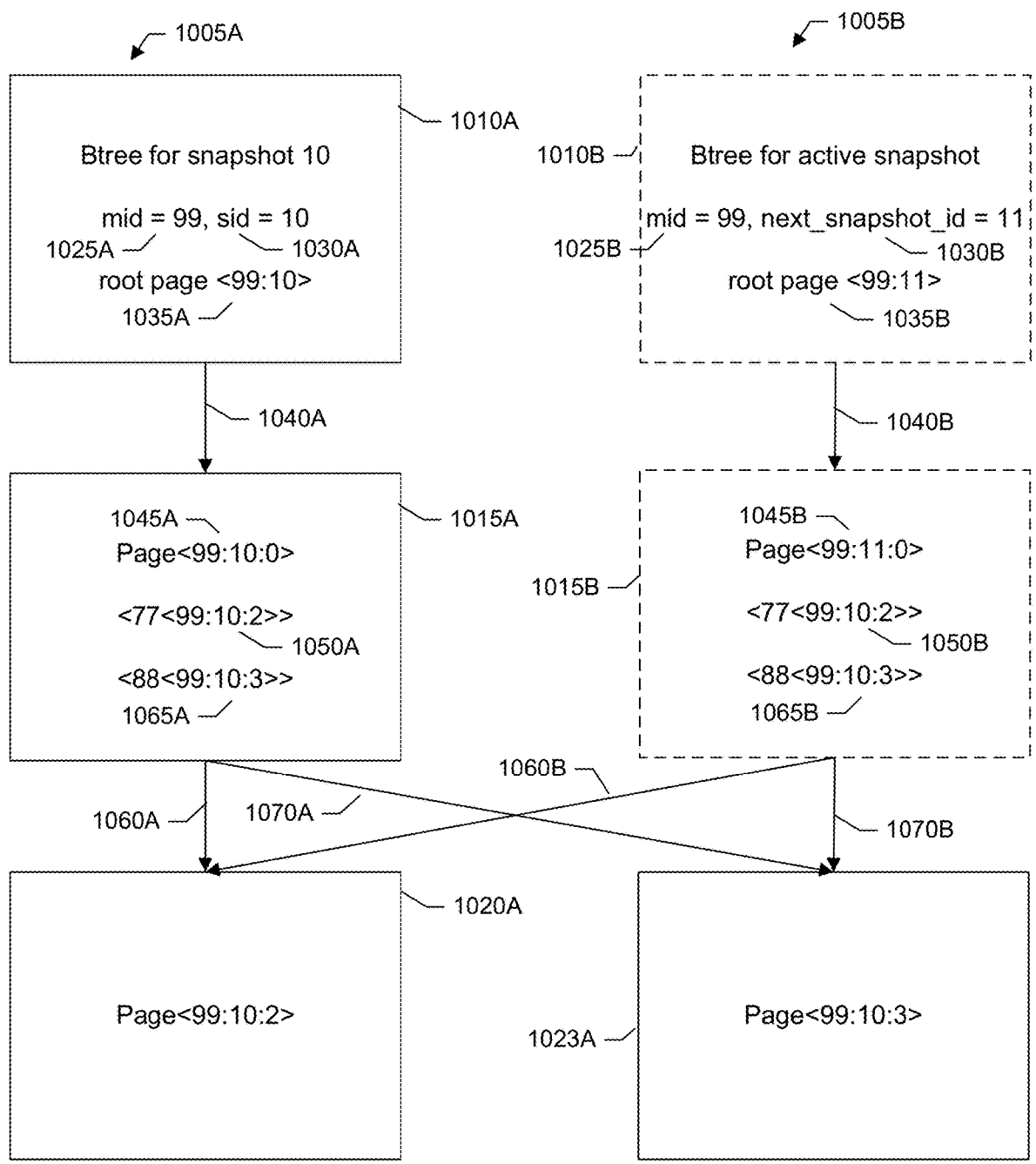
FIG. 10 shows an example of page sharing between snapshots, according to one or more embodiments.

FIG. 10 shows an example of page sharing between two snapshots once the last snapshot is taken (or between a first snapshot and active btree). In the example of FIG. 10, there is a B+ tree for a first snapshot 1005A and a B+ tree for a second snapshot 1005B. The first snapshot may be referred to as an old snapshot. The second snapshot may be referred to as a current or active btree. Pages shown in solid lines indicate pages owned by the old snapshot. Pages shown in broken lines indicate pages owned by the active btree.

The first or old snapshot includes pages 1010A, 1015A, 1020A, and 1023A. Page 1010A is a root page of the first snapshot. According to the sample data shown in FIG. 10, the first snapshot is of a namespace corresponding to a logical partition having an mtree identifier ("mid") 1025A of 99. The first snapshot has been assigned a snapshot identifier ("sid") 1030A of Thus, this B+ tree for this snapshot 10 can be identified 1035A using the mtree identifier 99 and snapshot identifier 10, e.g., <99:10>.

Root page 1010A points 1040A to page 1015A that is numbered page 0. Page 1015A is thus identified by a key 1045A in the key value store having an identifier of the logical partition (e.g., "mid" 99), identifier of the snapshot (e.g., "sid" 10), and page number (e.g., 0), i.e., <99:10:0>.

Page 1015A is an intermediate page and is shown as including a child pointer 1050A. As discussed, intermediate page entries have the form <dd_key_t:dd_btree_indirect_t>. A first value ("dd_key_t") identifies the btree-key that is looked up, e.g., 77. A second value ("dd_btree_indirect_t") is a record pointing to the child page of the B+ tree where the lookup should be continued.

In particular, the record specifies an mtree identifier ("mid"), snapshot identifier ("sid"), and page number (e.g., has the form <mid:sid:page_number>). In this example, the entry having values <99:10:2> thus points 1060A to page 1020A, i.e. page number 2 from snapshot 10 of logical partition 99.

In this example, page 1015A also includes a child pointer 1065A with an entry having values <99:10:3> and thus pointing 1070A to page 1023A, i.e., page number 3 from snapshot 10 of logical partition 99.

The second snapshot or active btree includes a page 1010B and 1015B. Page 1010B is a root page of the active btree. According to the sample data shown in FIG. 10, the active btree is of a namespace corresponding to a logical partition having an mtree identifier ("mid") 1025B of 99. The active btree has been assigned a snapshot identifier ("sid") 1030B of 11 as a result of incrementing the snapshot identifier of previous snapshot 10 (e.g., 10+1=11). Thus, this B+ tree for this active btree 11 can be identified 1035B using the mtree identifier 99 and snapshot identifier 11, e.g., <99:11>.

Root page 1010B points 1040B to page 1015B that is numbered page 0. Page 1015B is thus identified by a key 1045B in the key value store having an identifier of the logical partition (e.g., "mid" 99), identifier of the snapshot (e.g., "sid" 11), and page number (e.g., 0)—or <99:11:0>.

Page 1015B is an intermediate page and is shown as including a child pointer 1050B. As discussed, intermediate page entries have the form <dd_key_t:dd_btree_indirect_t>. A first value ("dd_key_t") identifies the btree-key that is looked up, e.g., 77. A second value ("dd_btree_indirect_t") is a record pointing to the child page of the B+ tree where the lookup should be continued.

In particular, the record specifies an mtree identifier ("mid"), snapshot identifier ("sid"), and page number (e.g., has the form <mid:sid:page_number>). In this example, the entry having values <99:10:2> thus points 1060B to page 1020A, i.e. page number 2 from snapshot 10 of logical partition 99. In other words, the "dd_btree_indirect_t" structure allows the key to point to a page having a different snapshot identifier, e.g., 10. Thus, existing page 2 (1020A) is shared between snapshot 10 and snapshot 11.

In this example, page 1010B also includes a child pointer 1065B with an entry having values <99:10:3> and thus pointing 1070B to page 1023A, i.e., page number 3 from snapshot 10 of logical partition 99. As discussed, the "dd"dd_btree_indirect_t" structure allows the key to point to a page having a different snapshot identifier, e.g., 10. Thus, existing page 3 (1023A) is shared between snapshot 10 and snapshot 11.

Figure 11:
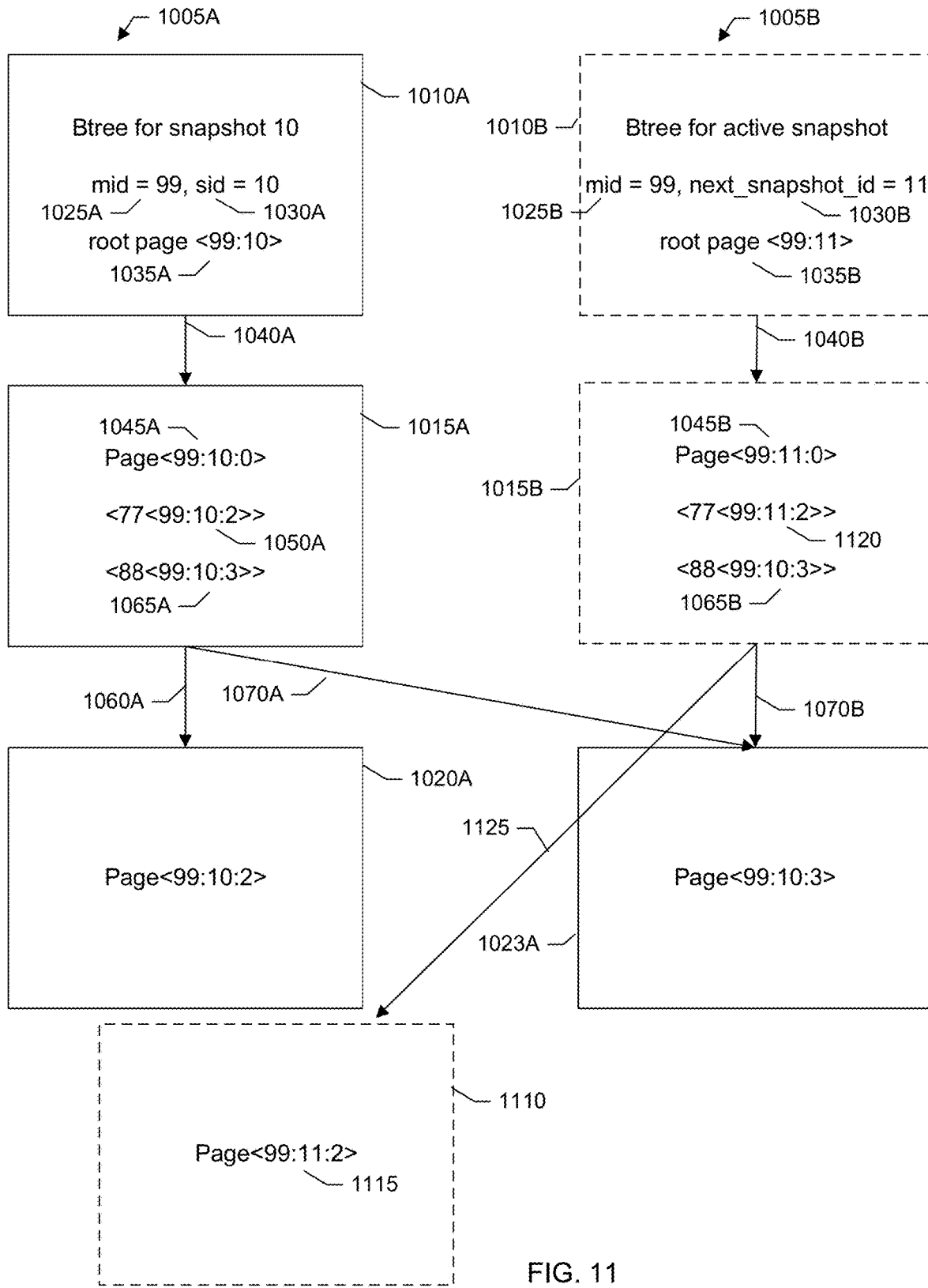
FIG. 11 shows an example of page sharing between snapshots after a write, according to one or more embodiments.

FIG. 11 shows an example of page sharing after page 2 is modified after the second snapshot is taken. In particular, a page 1110 has been written to the key value store. Page 1110 is identified by a key 1115 having an identifier of the logical partition (e.g., "mid" 99), identifier of the snapshot to which the now page belongs (e.g., "sid" 11), and page number (e.g., 2)—or <99:11:2>. Intermediate page 1015B of the active btree includes a child pointer 1120.

As discussed, intermediate page entries have the form <dd_key_t:dd_btree_indirect_t>. A first value ("dd_key_t") identifies the btree-key that is looked up, e.g., 77. A second value ("dd_btree_indirect_t") is a record pointing to the child page of the B+ tree where the lookup should be continued.

In particular, the record specifies an mtree identifier ("mid"), snapshot identifier ("sid"), and page number (e.g., has the form <mid:sid:page_number>). In this example, the entry having values <99:11:2> thus points 1125 to page 1110, i.e. page number 2 from snapshot 11 of logical partition 99.

As shown in the example of FIG. 11, existing page 2 1020A remains accessible by traversing down from root page 1010A of first snapshot 10 (1005A); while new page 2 1110 for the modification is accessible by traversing down from root page 1010B of second snapshot 11 (1005B) or the active btree.

Figure 12:
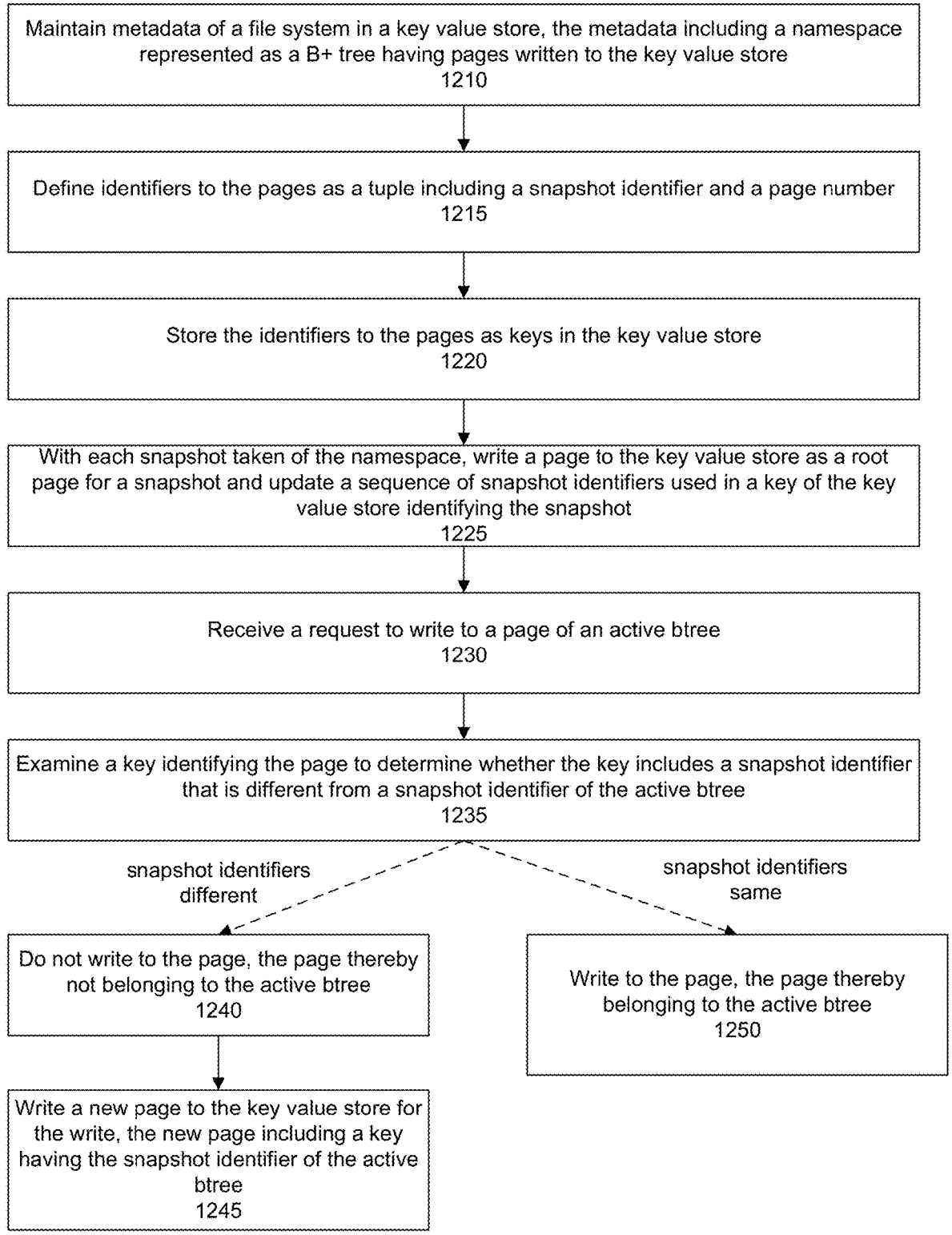
FIG. 12 shows a flow for determining ownership of existing page shared between snapshots, according to one or more embodiments.

FIG. 12 shows a detailed flow for using snapshot identifiers to determine whether a write to a page can proceed or a copy on write should be initiated. In a step 1210, metadata of a file system is maintained in a key value store. The metadata includes a namespace represented as a B+ tree having pages written to the key value store.

In a step 1215, identifiers to the pages are defined as a tuple including a snapshot identifier and a page number. In a step 1220, the identifiers to the pages are stored as keys in the key value store.

In a step 1225, with each snapshot taken of the namespace, a page is written to the key value store as a root page for a snapshot shot. A sequence of snapshot identifiers used in a key of the key value store identifying the snapshot is updated.

In a step 1230, a request is received to write to a page of an active btree. In a step 1235, a key identifying the page is examined to determine whether the key includes a snapshot identifier that is different from a snapshot identifier of the active btree.

If the snapshot identifiers are different, in a step 1240, writing to the page is not allowed, the page thereby not belonging to the active btree. Instead, in a step 1245, a new page is written to the key value store for the write. The new page is assigned a key having the snapshot identifier of the active btree.

Alternatively, if the snapshot identifiers are the same, in a step 1250, the write to the page is allowed as the page belongs to the active btree.

As discussed, in an embodiment, updating a sequence of snapshot identifiers includes incrementing a value of a snapshot identifier. It should be appreciated, however, that the updating the sequence of snapshot identifiers may instead include decrementing a value of the snapshot identifier. Any mathematical operation or combination of mathematical operations may be used to maintain the sequence of snapshot identifiers so long as the algorithm is consistently applied for each snapshot that is taken of the namespace.

In an embodiment, there is a method comprising: maintaining metadata of a file system in a key value store, the metadata comprising a namespace represented as a B+ tree having pages written to the key value store; defining identifiers to the pages as a tuple, the tuple comprising a snapshot identifier and a page number; storing the identifiers to the pages as keys in the key value store; tracking, using the snapshot identifiers, pages that are shared between first and second snapshots; upon a request to write to an existing page that is shared between the snapshots, determining from the snapshot identifiers whether the existing page belongs to the first snapshot or the second snapshot; if the existing page belongs to the second snapshot, allowing the write to the existing page; and if the existing page belongs to the first snapshot, performing a copy on write (COW) to generate a new page for the write.

In an embodiment, the tracking, using the snapshot identifiers, pages that are shared comprises with each snapshot that is taken of the namespace, writing a page to the key value store as a root page for a snapshot, and updating a sequence of snapshot identifiers used in a key of the key value store that identifies the snapshot.

In an embodiment, the performing the copy on write comprises: writing the new page to the key value store; and assigning a key to the new page, wherein the key comprises a snapshot identifier of the second snapshot.

In an embodiment, the updating the sequence of snapshot identifiers comprises: incrementing a snapshot identifier assigned to the first snapshot to generate a new snapshot identifier; and assigning the new snapshot identifier to the second snapshot.

In an embodiment, the method further comprises: examining whether a key identifying the existing page includes a snapshot identifier that is different from a snapshot identifier of the second snapshot; if the snapshot identifier is different, not writing to the existing page and writing a new page to the key value store for the write, the new page including a key having the snapshot identifier of the second snapshot; and if the snapshot identifier is the same, writing to the existing page.

In an embodiment, the file system comprises a deduplicated distributed file system that is partitioned into a plurality of logical partitions, each logical partition comprising a mountable directory hierarchy and a namespace represented as a B+ tree having pages stored in the key value store.

In another embodiment, there is a system comprising: a processor; and memory configured to store one or more sequences of instructions which, when executed by the processor, cause the processor to carry out the steps of: maintaining metadata of a file system in a key value store, the metadata comprising a namespace represented as a B+ tree having pages written to the key value store; defining identifiers to the pages as a tuple, the tuple comprising a snapshot identifier and a page number; storing the identifiers to the pages as keys in the key value store; tracking, using the snapshot identifiers, pages that are shared between first and second snapshots; upon a request to write to an existing page that is shared between the snapshots, determining from the snapshot identifiers whether the existing page belongs to the first snapshot or the second snapshot; if the existing page belongs to the second snapshot, allowing the write to the existing page; and if the existing page belongs to the first snapshot, performing a copy on write (COW) to generate a new page for the write, the page thereby belonging to the second snapshot.

In another embodiment, there is a computer program product, comprising a non-transitory computer-readable medium having a computer-readable program code embodied therein, the computer-readable program code adapted to be executed by one or more processors to implement a method comprising: maintaining metadata of a file system in a key value store, the metadata comprising a namespace represented as a B+ tree having pages written to the key value store; defining identifiers to the pages as a tuple, the tuple comprising a snapshot identifier and a page number; storing the identifiers to the pages as keys in the key value store; tracking, using the snapshot identifiers, pages that are shared between first and second snapshots; upon a request to write to an existing page that is shared between the snapshots, determining from the snapshot identifiers whether the existing page belongs to the first snapshot or the second snapshot; if the existing page belongs to the second snapshot, allowing the write to the existing page; and if the existing page belongs to the first snapshot, performing a copy on write (COW) to generate a new page for the write.

Figure 13:
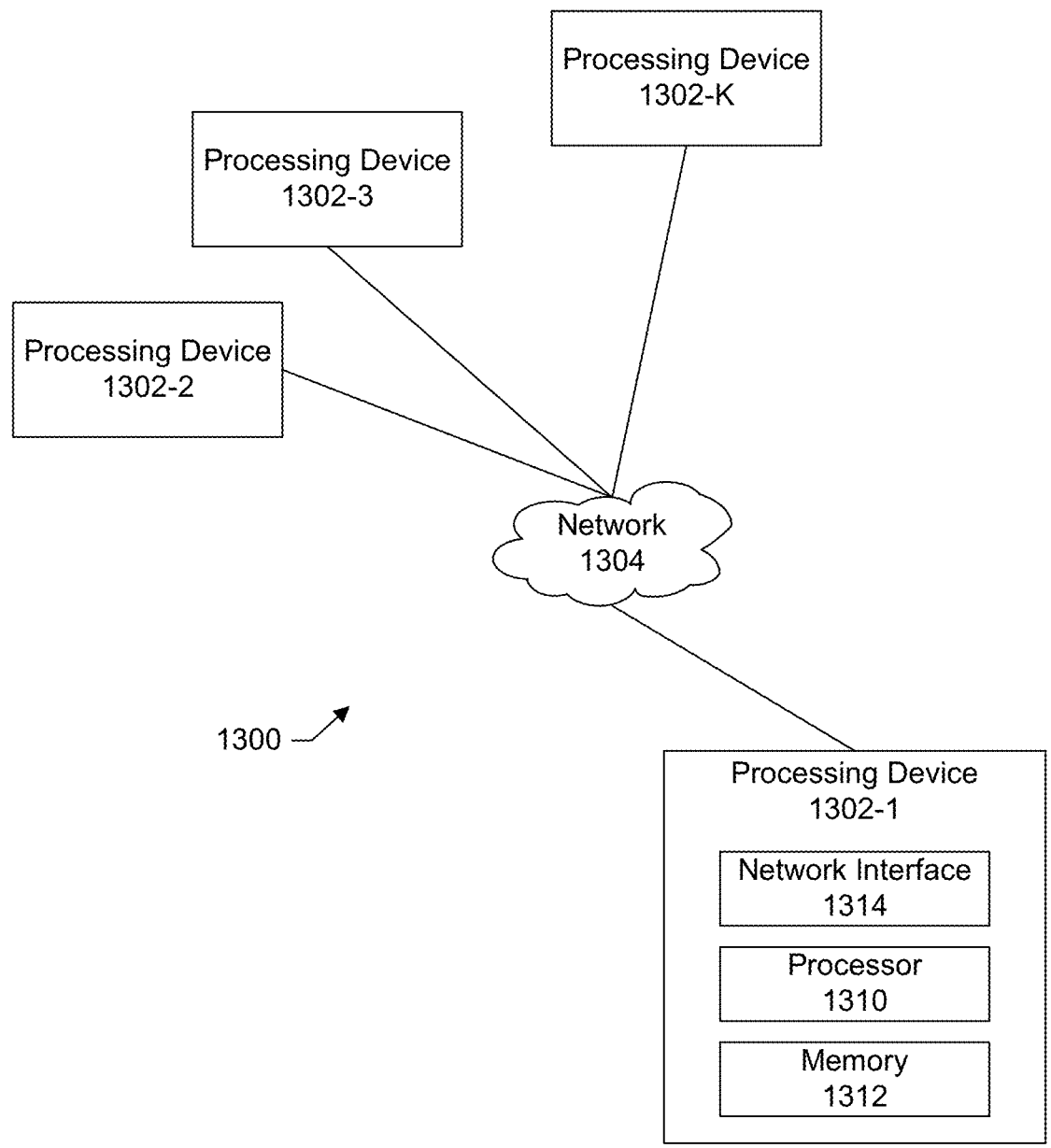
FIG. 13 shows another block diagram of a processing platform that may be utilized to implement at least a portion of an information processing system, according to one or more embodiments.

FIG. 13 shows an example of a processing platform 1300 that may be used with the information processing system shown in FIG. 1.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 14:
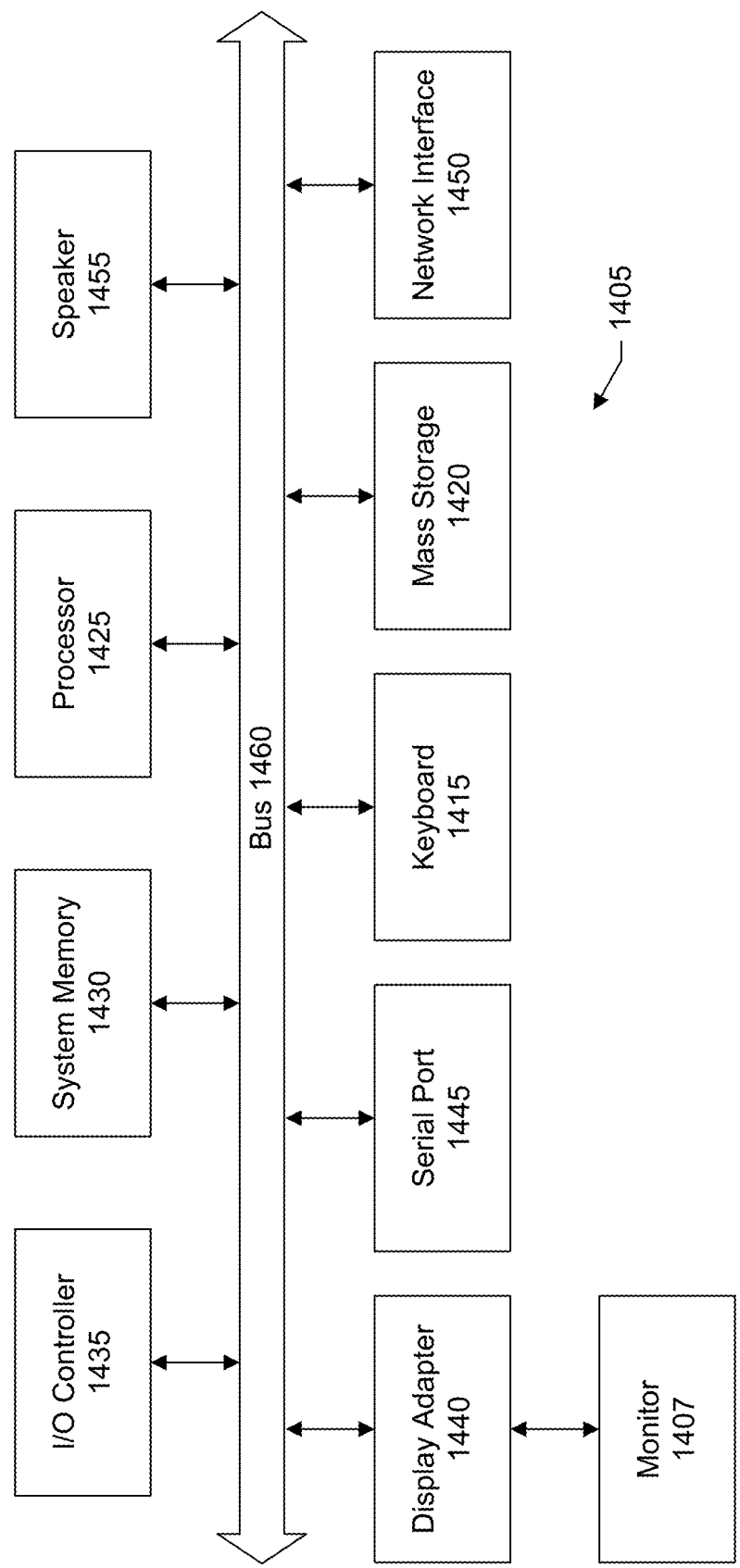
FIG. 14 shows a block diagram of a computer system suitable for use with the system, according to one or more embodiments.

FIG. 14 shows a system block diagram of a computer system 1405 used to execute the software of the present system described herein. The computer system includes a monitor 1407, keyboard 1415, and mass storage devices 1420. Computer system 1405 further includes subsystems such as central processor 1425, system memory 1430, input/output (I/O) controller 1435, display adapter 1440, serial or universal serial bus (USB) port 1445, network interface 1450, and speaker 1455. The system may also be used with computer systems with additional or fewer subsystems. For example, a computer system could include more than one processor 1425 (i.e., a multiprocessor system) or a system may include a cache memory.

Arrows such as 1460 represent the system bus architecture of computer system 1405. However, these arrows are illustrative of any interconnection scheme serving to link the subsystems. For example, speaker 1455 could be connected to the other subsystems through a port or have an internal direct connection to central processor 1425. The processor may include multiple processors or a multicore processor, which may permit parallel processing of information. Computer system 1405 shown in FIG. 14 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers. The variable N and other similar index variables are assumed to be arbitrary positive integers greater than or equal to two.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
maintaining metadata of a file system in a distributed key value store running on multiple nodes of a cluster hosting the file system, the metadata comprising multiple namespaces, each namespace represented as a B+ tree having pages written to the distributed key value store;

defining key names to the pages as a tuple, the tuple comprising an mtree identifier, a snapshot identifier and a page number, wherein the file system is divided into multiple logical partitions and the mtree identifier identifies a mountable directory hierarchy of a logical partition of the file system;

storing keys, having the key names, to the pages in the distributed key value store, each key name thereby comprising the mtree identifier, the snapshot identifier, and the page number;

tracking, using the mtree and the snapshot identifiers present in the key names, pages that are shared between first and second snapshots of a namespace corresponding to the mountable directory hierarchy of the file system, the first and the second snapshots not being immutable because the key value store in which the namespace is stored is not immutable, wherein the first snapshot comprises a first snapshot identifier, and the second snapshot comprises a second snapshot identifier, wherein the distributed key value store comprises a plurality of keys including a first key and a second key, the first key identifies a first page and a first key name of the first key comprises a first mtree identifier, the first snapshot identifier, and a first page number, the first page comprises a child pointer to a second page, the child pointer comprising an entry having the first mtree identifier, the first snapshot identifier, and a second page number, and has a key name comprising the first mtree identifier, the first snapshot identifier, and the second page number, the second key identifies a third page and a second key name of the second key comprises the first mtree identifier, the second snapshot identifier, and the first page number, and the third page comprises the child pointer to the second page;

receiving a request to write to the second page;

comparing a key name of the child pointer comprising the first mtree identifier and the first snapshot identifier in the third page and a key name of the second key comprising the first mtree identifier and the second snapshot identifier identifying the third page;

determining that the key name of the child pointer comprising the first mtree identifier and the first snapshot identifier in the third page is different from the key name of the second key comprising the first mtree identifier and the second snapshot identifier identifying the third page;

conducting a copy-on-write for the second page to create a new page; and modifying the child pointer of the third page with a new entry to point to the new page, the new entry comprising a new key having a new key name including the first mtree identifier, the second snapshot identifier, and the second page number.

2. The method of claim 1 wherein the tracking, using the mtree tree and the snapshot identifiers present in the key names, pages that are shared comprises with each snapshot that is taken of the namespace, writing a page to the distributed key value store as a root page for the snapshot, and updating a sequence of snapshot identifiers used in a key name of a key of the distributed key value store that identifies the snapshot.

3. The method of claim 1 further comprising:

incrementing the first snapshot identifier to obtain the second snapshot identifier;

dirtying a root page of the first snapshot; and flushing the dirtied root page with a key having a key name comprising the first mtree identifier, the second snapshot identifier, and the first page number, wherein the dirtied and flushed root page in the distributed key value store is now a root page for the second snapshot and accessible from the distributed key value store using the key having the key name comprising the first mtree identifier, the second snapshot identifier, and the first page number, and wherein the root page for the first snapshot is accessible from the distributed key value store using the key having the key name comprising the first mtree identifier, the first snapshot identifier, and the first page number;

creating a root page corresponding to a current state of the file system, the root page having the incremented snapshot identifier; and flushing pages of the snapshot by writing keys of the pages to the key value store, each key comprising a snapshot identifier having a previous value of the incremented snapshot identifier, and an identifier of a logical partition of the file system.

4. The method of claim 1 wherein the pages of the B+ tree holding the namespace is kept in the distributed key value store with the keys identifying the pages and content of the pages stored as values for the keys.

5. The method of claim 1 wherein a form of the keys in the distributed key value store comprises a fixed string, followed by the mtree identifier, followed by the snapshot identifier, followed by the page number.

6. The method of claim 1 wherein the second snapshot is an active snapshot of the namespace and is exposed as a writable new namespace.

7. The method of claim 1 further comprising:

after the conducting the copy-on-write to create the new page, receiving a request to write to the new page;

comparing a key name of the new key comprising the first mtree identifier and the second snapshot identifier in the third page and the key name of the second key comprising the first mtree identifier and the second snapshot identifier identifying the third page;

determining that the key name of the new key comprising the first mtree identifier and the second snapshot identifier in the third page matches the key name of the second key comprising the first mtree identifier and the second snapshot identifier identifying the third page; and allowing the write to the new page without performing a copy-on-write.

8. A system comprising:

a processor; and memory configured to store one or more sequences of instructions which, when executed by the processor, cause the processor to carry out the steps of:

maintaining metadata of a file system in a distributed key value store running on multiple nodes of a cluster hosting the file system, the metadata comprising multiple namespaces, each namespace represented as a B+ tree having pages written to the distributed key value store;

defining key names to the pages as a tuple, the tuple comprising an mtree identifier, a snapshot identifier and a page number, wherein the file system is divided into multiple logical partitions and the mtree identifier identifies a mountable directory hierarchy of a logical partition of the file system;

storing keys, having the key names, to the pages in the distributed key value store, each key name thereby comprising the mtree identifier, the snapshot identifier, and the page number;

tracking, using the mtree and the snapshot identifiers present in the key names, pages that are shared between first and second snapshots of a namespace corresponding to the mountable directory hierarchy of the file system, the first and the second snapshots not being immutable because the key value store in which the namespace is stored is not immutable, wherein the first snapshot comprises a first snapshot identifier, and the second snapshot comprises a second snapshot identifier, wherein the distributed key value store comprises a plurality of keys including a first key and a second key,
the first key identifies a first page and a first key name of the first key comprises a first mtree identifier, the first snapshot identifier, and a first page number,
the first page comprises a child pointer to a second page, the child pointer comprising an entry having the first mtree identifier, the first snapshot identifier, and a second page number, and has a key name comprising the first mtree identifier, the first snapshot identifier, and the second page number,
the second key identifies a third page and a second key name of the second key comprises the first mtree identifier, the second snapshot identifier, and the first page number, and
the third page comprises the child pointer to the second page;
receiving a request to write to the second page;
comparing a key name of the child pointer comprising the first mtree identifier and the first snapshot identifier in the third page and a key name of the second key comprising the first mtree identifier and the second snapshot identifier identifying the third page;
determining that the key name of the child pointer comprising the first mtree identifier and the first snapshot identifier in the third page is different from the key name of the second key comprising the first mtree identifier and the second snapshot identifier identifying the third page;
conducting a copy-on-write for the second page to create a new page; and
modifying the child pointer of the third page with a new entry to point to the new page, the new entry comprising a new key having a new key name including the first mtree identifier, the second snapshot identifier, and the second page number.

9. The system of claim 8 wherein the tracking, using the mtree and the snapshot identifiers present in the key names, pages that are shared comprises with each snapshot that is taken of the namespace,
writing a page to the distributed key value store as a root page for the snapshot, and
updating a sequence of snapshot identifiers used in a key name of a key of the distributed key value store that identifies the snapshot.

10. The system of claim 8 wherein the processor further carries out the steps of:
incrementing the first snapshot identifier to obtain the second snapshot identifier;
dirtying a root page of the first snapshot; and
flushing the dirtied root page with a key having a key name comprising the first mtree identifier, the second snapshot identifier, and the first page number, and
wherein the dirtied and flushed root page in the distributed key value store is now a root page for the second snapshot and accessible from the distributed key value store using the key having the key name comprising the first mtree identifier, the second snapshot identifier, and the first page number.

11. The system of claim 8 wherein the pages of the B+ tree holding the namespace is kept in the distributed key value store with the keys identifying the pages and content of the pages stored as values for the keys.

12. The system of claim 8 wherein a form of the keys in the distributed key value store comprises a fixed string, followed by the mtree identifier, followed by the snapshot identifier, followed by the page number.

13. The system of claim 8 wherein the second snapshot is an active snapshot of the namespace and is exposed as a writable new namespace.

14. The system of claim 8 wherein the processor further carries out the steps of:
after the conducting the copy-on-write to create the new page, receiving a request to write to the new page;
comparing a key name of the new key comprising the first mtree identifier and the second snapshot identifier in the third page and the key name of the second key comprising the first mtree identifier and the second snapshot identifier identifying the third page;
determining that the key name of the new key comprising the first mtree identifier and the second snapshot identifier in the third page matches the key name of the second key comprising the first mtree identifier and the second snapshot identifier identifying the third page; and
allowing the write to the new page without performing a copy-on-write.

15. A computer program product, comprising a non-transitory computer-readable medium having a computer-readable program code embodied therein, the computer-readable program code configured to be executed by one or more processors to implement a method comprising:
maintaining metadata of a file system in a distributed key value store running on multiple nodes of a cluster hosting the file system, the metadata comprising multiple namespaces, each namespace represented as a B+ tree having pages written to the distributed key value store;
defining key names to the pages as a tuple, the tuple comprising an mtree identifier, a snapshot identifier and a page number, wherein the file system is divided into multiple logical partitions and the mtree identifier identifies a mountable directory hierarchy of a logical partition of the file system;
storing keys, having the key names, to the pages in the distributed key value store, each key name thereby comprising the mtree identifier, the snapshot identifier, and the page number;
tracking, using the mtree and the snapshot identifiers present in the key names, pages that are shared between first and second snapshots of a namespace corresponding to the mountable directory hierarchy of the file system, the first and the second snapshots not being immutable because the key value store in which the namespace is stored is not immutable, wherein the first snapshot comprises a first snapshot identifier, and the second snapshot comprises a second snapshot identifier,
wherein the distributed key value store comprises a plurality of keys including a first key and a second key,
the first key identifies a first page and a first key name of the first key comprises a first mtree identifier, the first snapshot identifier, and a first page number,
the first page comprises a child pointer to a second page, the child pointer comprising an entry having the first mtree identifier, the first snapshot identifier, and a second page number, and has a key name comprising the first mtree identifier, the first snapshot identifier, and the second page number, the second key identifies a third page and a second key name of the second key comprises the first mtree identifier, the second snapshot identifier, and the first page number, and the third page comprises the child pointer to the second page;

receiving a request to write to the second page;

comparing a key name of the child pointer comprising the first mtree identifier and the first snapshot identifier in the third page and a key name of the second key comprising the first mtree identifier and the second snapshot identifier identifying the third page;

determining that the key name of the child pointer comprising the first mtree identifier and the first snapshot identifier in the third page is different from the key name of the second key comprising the first mtree identifier and the second snapshot identifier identifying the third page;

conducting a copy-on-write for the second page to create a new page; and modifying the child pointer of the third page with a new entry to point to the new page, the new entry comprising a new key having a new key name including the first mtree identifier, the second snapshot identifier, and the second page number.

16. The computer program product of claim 15 wherein the tracking, using the mtree and the snapshot identifiers present in the key names, pages that are shared comprises with each snapshot that is taken of the namespace, writing a page to the distributed key value store as a root page for a snapshot, and updating a sequence of snapshot identifiers used in a key name of a key of the distributed key value store that identifies the snapshot.

17. The computer program product of claim 15 wherein the method further comprises:

incrementing the first snapshot identifier to obtain the second snapshot identifier;

dirtying a root page of the first snapshot; and flushing the dirtied root page with a key having a key name comprising the first mtree identifier, the second snapshot identifier, and the first page number, wherein the dirtied and flushed root page in the distributed key value store is now a root page for the second snapshot and accessible from the distributed key value store using the key having the key name comprising the first mtree identifier, the second snapshot identifier, and the first page number, and wherein the root page for the first snapshot is accessible from the distributed key value store using the key having the key name comprising the first mtree identifier, the first snapshot identifier, and the first page number.

18. The computer program product of claim 15 wherein the pages of the B+ tree holding the namespace is kept in the distributed key value store with the keys identifying the pages and content of the pages stored as values for the keys.

19. The computer program product of claim 15 wherein the second snapshot is an active snapshot of the namespace and is exposed as a writeable new namespace.

20. The computer program product of claim 15 wherein the method further comprises:

after the conducting the copy-on-write to create the new page, receiving a request to write to the new page;

comparing a key name of the new key comprising the first mtree identifier and the second snapshot identifier in the third page and the key name of the second key comprising the first mtree identifier and the second snapshot identifier identifying the third page;

determining that the key name of the new key comprising the first mtree identifier and the second snapshot identifier in the third page matches the key name of the second key comprising the first mtree identifier and the second snapshot identifier identifying the third page; and allowing the write to the new page without performing a copy-on-write.

* * * * *